(12) United States Patent
Kimishima et al.

(10) Patent No.: US 8,426,070 B2
(45) Date of Patent: Apr. 23, 2013

(54) METHOD FOR REMOVING DILUENT FROM AN EXTRUDATE OF A POLYMER SOLUTION

(75) Inventors: Kotaro Kimishima, Yokohama (JP); Sadakatsu Suzuki, Kawaguchi (JP)

(73) Assignee: Toray Battery Separator Film Co., Ltd., Tochigi (JP)

( * ) Notice: Subject to any disclaimer, the term of this patent is extended or adjusted under 35 U.S.C. 154(b) by 315 days.

(21) Appl. No.: 12/747,831

(22) PCT Filed: Dec. 12, 2008

(86) PCT No.: PCT/JP2008/073143
§ 371 (c)(1),
(2), (4) Date: Jun. 11, 2010

(87) PCT Pub. No.: WO2009/078477
PCT Pub. Date: Jun. 25, 2009

(65) Prior Publication Data
US 2010/0273032 A1 Oct. 28, 2010

(30) Foreign Application Priority Data

Dec. 14, 2007 (JP) .................................. 2007-324045

(51) Int. Cl.
B01D 71/06 (2006.01)
H01M 2/16 (2006.01)
C08J 9/28 (2006.01)

(52) U.S. Cl.
USPC ................ 429/326; 429/50; 429/122; 521/64

(58) Field of Classification Search .................. 429/326, 429/122, 50; 521/64
See application file for complete search history.

(56) References Cited

U.S. PATENT DOCUMENTS
2007/0012617 A1 * 1/2007 Suzuki et al. ............ 210/500.27

FOREIGN PATENT DOCUMENTS

| JP | 50-112309 A | 9/1975 |
| JP | 60-212433 A | 10/1985 |
| JP | 60-242035 A | 12/1985 |
| JP | 06-031255 A | 2/1994 |
| JP | 11-207093 A | 8/1999 |
| JP | 2002-012694 A | 1/2002 |
| JP | 2002-012695 A | 1/2002 |
| JP | 2002-256099 A | 9/2002 |
| JP | 2008-045107 A | 2/2008 |

* cited by examiner

Primary Examiner — Randy Gulakowski
Assistant Examiner — Kara Boyle
(74) Attorney, Agent, or Firm — Sughrue Mion, PLLC

(57) ABSTRACT

The invention relates to a method for removing diluent from a polymer extrudate, especially in connection with a process for producing a microporous membrane. The method involves contacting the extrudate with a second solvent in a first stage; contacting the extrudate from the first stage with a third solvent in a second stage; conducting a first stream away from the first stage and/or conducting a second stream away from the second stage; and cooling at least a portion of the first and/or second stream and separating therefrom at least one of a first phase rich in the second solvent or a second phase rich in the third solvent.

23 Claims, 7 Drawing Sheets

METHOD FOR REMOVING DILUENT FROM AN EXTRUDATE OF A POLYMER SOLUTION

CROSS REFERENCE TO RELATED APPLICATIONS

This application is a National Stage of International Application No. PCT/JP2008/073143 filed Dec. 12, 2008, claiming priority based on Japanese Patent Application No. 2007-324042 filed Dec. 14, 2007, the contents of all of which are incorporated herein by reference in their entirety.

FIELD OF THE INVENTION

The invention relates to a method for removing diluent from a polymer extrudate, especially in connection with a process for producing a microporous membrane.

BACKGROUND OF THE INVENTION

Microporous thermoplastic membranes can be used as battery separators in, e.g., primary and secondary lithium secondary batteries, lithium polymer batteries, nickel-hydrogen batteries, nickel-cadmium batteries, nickel-zinc batteries, silver-zinc secondary batteries, etc. When microporous thermoplastic membranes are used for battery separators, particularly lithium ion battery separators, the membranes' properties significantly affect the performance, productivity and safety of the resulting batteries. Such microporous polymeric (e.g., thermoplastic) membranes can be produced, e.g., by "dry" or "wet" processes. Dry processes involve producing the membrane from a polymer melt. Wet processes involve combining one or more polymers with diluent (e.g., solvent) to form a polyolefin solution, extruding the polyolefin solution to form a sheet, and then removing at least a portion of the diluent form the sheet to form a polymeric membrane. As might be appreciated, diluent removal is an important process step in the wet process.

In a wet process, the diluent (also called a solvent, membrane-forming solvent, or process solvent) is generally removed from a cooled extrudate to form the polymeric membrane. In the wet process, a solvent washing step (also called a solvent treatment) can be used to remove solvent from the extrudate. Generally, the diluent used to produce the polymer solution is called the "process solvent" or "P-Sol", and the washing solvent used for washing (or displacing) the process solvent from the extrudate is called the "washing solvent". For example, JP60-242035A discloses that a chlorine containing solvent, such as dichloromethane (DCM) can be used as a washing solvent to remove a liquid paraffin process solvent from an extrudate. One problem with this approach is that the residual DCM in pores of microporous membrane after washing can degrade the membrane's properties. While it might be possible to overcome this problem by, e.g., adding an agent capable of modifying the surface tension of the residual DCM in the membrane's pores, residual surface agent in the membrane's pores would might undesirable affect the membrane's porosity.

JP2002-012694 A, JP2002-012695A and JP2002-256099 A disclose washing solvents such as hydrofluoroether (FIFE), either alone or in combination with other solvents such as decane. While HFE has a low surface tension, and HFE does not degrade microporous membrane's properties as much as DCM alone, HFE is not as good a washing solvent as DCM because HFE is less miscible with commonly-used process solvents (such as liquid paraffin) than is DCM. Consequently, the rate of removing process solvent by washing the extrudate with HFE is lower than when DCM is used. Since the removal rate is lower, longer washing times are needed, which causes a decrease in the amount of membrane produced by the wet process. Mixtures of HFE and DCM have been proposed for process solvent removal since HFE-DCM mixtures generally have a lower surface tension than DCM. Consequently, using an HFE-DCM mixture as a washing solvent does not degrade microporous membrane's properties as much as when the washing solvent is DCM alone. Moreover, mixtures of DCM and HFE are more miscible with commonly used process solvents than is HFE alone.

JP2002-256099 A discloses using DCM as a first washing solvent in a first washing stage and HFE as a second washing solvent in a second washing stage downstream of the first washing stage. The second washing stage uses HFE to rinse away at least some of the DCM remaining in the extrudate after the first washing stage. For this reason, the FIFE can be called a rinsing solvent. Using this approach, the problems associated with residual DCM in the membrane's pores can be overcome since the HFE rinsing step removes the undesirable DCM. Even so, such a process is difficult to operate continuously because the DCM rinsed from the membrane in the second stage will accumulate in the FIFE. Accordingly, the FIFE can be replaced with fresh HFE, and/or the DCM should be separated from the FIFE so that the HFE can be made available for recycle and re-use. The first option is inefficient and expensive. The second option (removing the DCM from the HFE and recycling the purified HFE) is problematic because FIFE is miscible with DCM. Moreover, HFE and DCM are difficult to separate by conventional methods (e.g., fractional distillation) because they have similar boiling points. Finally, even if separation by fractional distillation could be accomplished efficiently, HFE and DCM together form an azeotrope which contains a significant amount of both HFE and DCM. As might be appreciated, such an azeotrope cannot be separated by distillation.

It would therefore be desirable to further improve the wet process by efficiently recycling and re-using DCM, FIFE, or both.

SUMMARY OF THE INVENTION

In an embodiment, the invention relates to a process for removing at least a portion of a first solvent (or "process solvent") from a polymeric extrudate. The polymeric extrudate can be produced, e.g., from a polymeric solution comprising polymer and the process solvent. The extrudate can be a porous extrudate. The process solvent can be removed by contacting the extrudate with a second solvent (or "washing solvent") in a washing stage and then contacting the washed extrudate with a third solvent (or "rinsing solvent") in a rinsing stage.

Accordingly, in one embodiment the invention relates to a process for removing a first solvent from a polymeric extrudate, comprising:
 (A) contacting the extrudate with a second solvent comprising at least one chlorinated hydrocarbon in a first (or washing) stage;
 (B) contacting the washed extrudate from step (A) with a third solvent comprising at least one hydrofluoroether, in a second (or rinsing) stage;
 (C) conducting a first stream away from the washing stage, the first stream comprising at least a portion of the chlorinated hydrocarbon in the washing stage and/or conducting a second stream away from the rinsing stage, the second stream comprising at least a portion of the hydrofluoroether in the rinsing stage;

(D) optionally combining at least a portion of each of the first and second streams to form a third stream and then separating at least a portion of the first solvent from the combined streams, or separating at least a portion of the first solvent from the first stream and then combining the first stream (now lean in the first solvent) with the second stream to form the third stream; and (E) cooling at least a portion of the first stream, at least a portion second stream, or at least a portion of the third stream, and separating therefrom a first phase rich in chlorinated hydrocarbon, a second phase rich in hydrofluoroether, or both the first phase and the second phase.

The process can further comprise (F) recycling at least a portion of the first phase to the washing stage and/or recycling at least a portion of the second phase to the rinsing stage.

In an embodiment, the process is operated continuously, i.e., at least a portion of the first phase continuously or semi-continuously replenishes at least a portion of the washing solvent that is conducted away from the washing stage in the first stream, or at least a portion of the second phase continuously or semi-continuously replenishes at least a portion of the rinsing solvent that is conducted away from the rinsing stage in the second stream, or both.

In another embodiment, the invention relates to a for producing a microporous polymeric film, the process comprising (1) providing a polymer resin or optionally combining two or more polymer resins;

(2) combining the polymer resin(s) and one or more process solvents to form a polymeric solution;

(3) extruding the polymeric solution to produce a polymeric extrudate;

(5) removing at least a portion of the process solvent from the extrudate by the steps of (A) contacting the extrudate with a second solvent comprising at least one chlorinated hydrocarbon in a washing stage; and then (B) contacting the washed extrudate from step (A) with a third solvent comprising at least one hydrofluoroether in a rinsing stage;

(C) conducting a first stream away from the washing stage, the first stream comprising at least a portion of the chlorinated hydrocarbon in the washing stage and/or conducting a second stream away from the rinsing stage, the second stream comprising at least a portion of the hydrofluoroether in the rinsing stage; and (E) cooling at least a portion of the first, at least a portion second stream, or at least a portion of the third stream, and separating therefrom a first phase rich in chlorinated hydrocarbon, a second phase rich in hydrofluoroether, or both the first phase and the second phase.

The process can further comprise (D) combining at least a portion of each of the first and second streams from Step (C) to form a third stream and separating at least a portion of the first solvent from the combined streams, or separating at least a portion of the first solvent from the first stream and then combining the first with the second stream to form the third stream, and then conducting the third stream to Step (E).

The process can further comprise, e.g., the step of 5(F) removing at least a portion of any volatile species from the rinsed extrudate.

In an embodiment, the cooling of step 5(E) is conducted at a temperature which produces the first phase having a chlorinated hydrocarbon concentration that is at least as large as the concentration of chlorinated hydrocarbon in the first stream. In another embodiment, the cooling of step 5(E) is conducted at a temperature which produces the first phase having a hydrofluoroether concentration that is at least as large as the concentration of hydrofluoroether in the second stream. The process can further comprise separating process solvent from one or more of the first, second, or third stream before cooling in step 5(E), and then recycling the process solvent to step (2).

The processes of these embodiments can, e.g., further comprise optional processing steps such conventional steps of thermal treatment, cross linking, etc., as are commonly used in the processing of microporous polymeric membranes, particularly microporous polyolefin membranes. The processes can be operated continuously, semi-continuously, or as a batch process, for example.

In another embodiment, the invention relates to a battery, preferably a secondary battery, more preferable a lithium ion secondary battery, comprising an anode, a cathode, an electrolyte, and a battery separator located between the anode and the cathode, wherein the battery separator comprises the microporous polyolefin membrane.

In yet another embodiment, the invention relates to a method for using a battery of any of the preceding embodiments as a source and/or sink of electric current. For example, the invention relates to the use of one or more batteries of any of the preceding embodiments, alone or in combination, as a power source (particularly a rechargeable power source) for electrical and/or electronic equipment.

BRIEF DESCRIPTION OF THE DRAWINGS

FIG. 5 (b) shows the boiling point of the azeotrope containing significant amounts of DCM and HFE.

DETAILED DESCRIPTION OF THE INVENTION

[1] Preparing Polymer Extrudate

Figure 1:
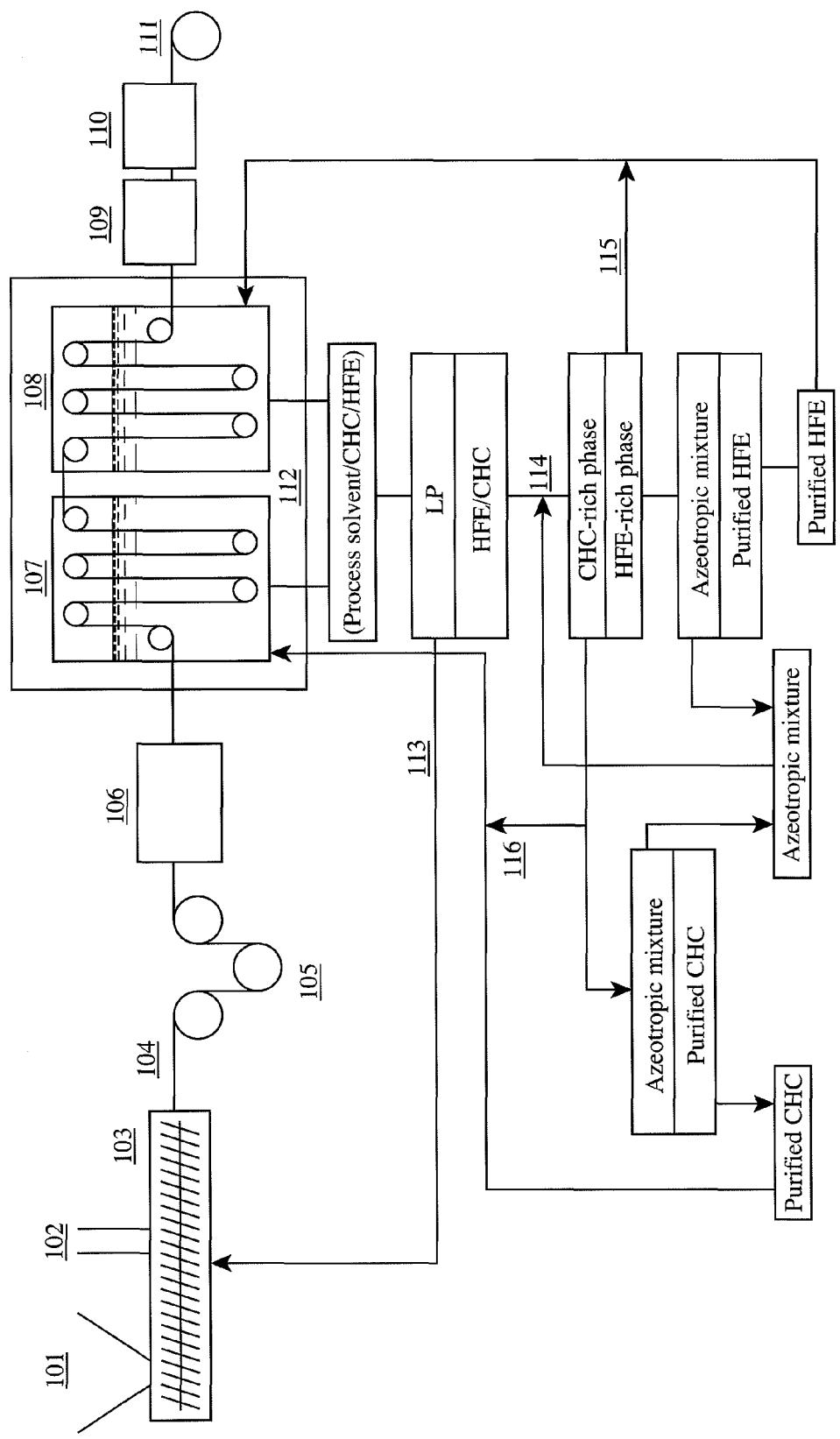
FIG. 1 schematically shows a continuous process for manufacturing microporous polymeric film, where a liquid paraffin diluent (the P-sol) is washed from the extrudate by a mixture of CHC and HFE in a first stage, and the washed extrudate is conducted to a second stage where a mixture of CHC and FIFE is used to rinse the extrudate. Purified CHC and HFE can be recovered for recycle to the process as shown. Instead of, or in addition to this, a first phase rich in CHC (obtained from the cooling stage) and/or a second phase obtained from rich in HFE (also obtained from the cooling stage) can be recycled to the washing stage and rinsing stage respectively. An azeotrope of CHC and HFE can be recycled from the distillation steps (for extinction) in the cooling step, as shown.

The invention is based in part on the discovery of a method for the efficient removal of a process solvent from a polymeric extrudate by washing the extrudate with a washing solvent comprising chlorinated hydrocarbon and then rinsing the washed extrudate in a rinsing stage with a solvent comprising a fluoridated ether. The washing solvent removes at least a portion of the process solvent from the extrudate and the rinsing solvent removes at least a portion of the washing solvent. The method is advantageous in that it overcomes the problems associated with residual washing solvent in the extrudate, as in JP2002-256099 A which is incorporated by reference herein, and also in that it efficiently makes available at least a portion of the rinsing solvent for recycle to the rinsing stage, thereby obviating the need for make-up rinsing solvent.

In an embodiment, the invention relates to a method for removing process solvent from polymer extrudate in a "wet" process for producing microporous membranes. The membrane is produced by extruding a polymeric solution and then processing the resulting extrudate. In order to prepare the polymeric extrudate, at least one polymer (generally in the form of a resin or mixture of resins) is combined with at least one diluent (e.g., a process solvent). See for example, PCT Patent Application WO/2007/117042, which is incorporated by reference herein. The invention is compatible with processes which produce layered microporous membranes. Such processes include, for example, coextrusion process where at least two polymeric solutions are coextruded through a die to produce a multi-layer extrudate and then subsequently processing the multi-layer extrudate to produce the multi-layer microporous membrane. Alternatively, individual microporous membranes can be produced in wet processes, which can then be laminated to form the multi-layer microporous membrane. While not limited thereto, the invention will be described in terms of the production of a microporous polyolefin membrane.

(1) Starting Material

The microporous polyolefin membrane is produced from a polyolefin solution. The polyolefin solution is produced from at least one polyolefin resin and at least one diluent.

(A) Polyolefin Resin

In an embodiment, polyolefin resin can be at least one polyethylene (PE), polypropylene (PP), polybutene-1 (PB-1), polymethylpenetene-1 (PMP). The resin can be, e.g., a homopolymer or copolymer of the desired polyolefin. The weight-average molecular weight Mw of the polyolefin is not critical, and can be in the range of about $1 \times 10^4$ to about $1 \times 10^7$, or about $1 \times 10^5$ to about $5 \times 10^6$, or about $2 \times 10^5$ to about $3 \times 10^6$. When the polyolefin is polyethylene, the Mw/Mn of the polyethylene resin is generally in the range of about 5 to about 300, or from about 5 to about 100, or from about 5 to about 30. In an embodiment, polyolefin resin can contain polyethylene, or polyethylene and polypropylene.

More than one polyolefin resin can be used to produce the polyolefin solution. For example, the polyolefin can contain resins of a first polyethylene, second polyethylene, first polypropylene, second polypropylene, etc. In an embodiment, the first polyethylene resin is a polyethylene having an Mw of less than $1 \times 10^6$, for example, a polyethylene having an Mw ranging from about $1 \times 10^4$ to about $5 \times 10^5$. Optionally, the polyethylene resin can be one or more of a high-density polyethylene resin (HDPE), a medium-density polyethylene, a branched low-density polyethylene, or a linear low-density polyethylene. Although it is not critical, the Mw of high-density polyethylene resin can range, for example, from about $1 \times 10^5$ to about $5 \times 10^5$, or from about $2 \times 10^5$ to about $4 \times 10^5$. In an embodiment, the first polyethylene is resin at least one of (i) an ethylene homopolymer or (ii) a copolymer of ethylene and a second α-olefin such as propylene, butene-1, hexene-1, etc, typically in a relatively small amount compared to the amount of ethylene. Such a copolymer can be produced using a single-site catalyst.

In an embodiment, the second polyethylene resin is a polyethylene having an Mw of at least about $1 \times 10^6$. For example, a second polyethylene resin can be an ultra-high molecular weight polyethylene ("UHMWPE"). For example, the second polyethylene resin can be at least one of (i) an ethylene homopolymer or (ii) a copolymer of ethylene and a third α-olefin which is typically present in a relatively small amount compared to the amount of ethylene. The third α-olefin can be, for example, one or more of propylene, butene-1, pentene-1, hexene-1,4-methylpentene-1, octene-1, vinyl acetate, methyl methacrylate, or styrene. Although it is not critical, the Mw of the second polyethylene can range from about $1 \times 10^6$ to about $15 \times 10^6$, or from about $1 \times 10^6$ to about $5 \times 10^6$, or from about $1 \times 10^6$ to about $3 \times 10^6$.

When the polyethylene solution is produced from both the first and second polyethylene, the amount of the second polyethylene in the polyolefin solution (based on the total weight of polyethylene in the polyolefin solution) can be, e.g., in the range of about 1wt. % to about 99 wt. % of, although this amount is not critical. In an embodiment, the polyethylene or the polyethylene composition further comprise the second polyolefin. In an embodiment, the second polyolefin can be selected at least one of polypropylene (PP), polybutene-1, polypentene-1, poly-4-methylpentene-1, polyhexene-1, polyoctene-1, polyvinyl acetate, polymethyl methacrylate, polystyrene and an ethylene α-olefin copolymer. In an embodiment, the second polyolefin is PP.

Polypropylene resin(s) useful for forming the polyolefin solutions include, e.g., one or more of (i) a propylene homopolymer or (ii) a copolymer of propylene and a fourth olefin. The copolymer can be a random or block copolymer.

The fourth olefin can be, e.g., one or more α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. While it is not critical, the polypropylene resin can optionally have one or more of the following properties: (i) the polypropylene has an Mw in a range of about $1\times10^4$ to about $4\times10^6$, or about $3\times10^5$ to about $3\times10^6$; (ii) the polypropylene has an Mw/Mn in a range of about 1.01 to about 100, or about 1.1 to about 50; (iii) the polypropylene's tacticity is isotactic; (iv) the polypropylene has a heat of fusion of at least about 90 Joules/gram; (v) polypropylene has a melting peak (second melt) of at least about 160° C., (vi) the polypropylene has a Trouton's ratio of at least about 15 when measured at a temperature of about 230° C. and a strain rate of 25 $sec^{-1}$; and/or (vii) the polypropylene has an elongational viscosity of at least about 50,000 Pa sec at a temperature of 230° C. and a strain rate of 25 $sec^{-1}$.

(B) Process Solvent

As long as combination of the polyolefin resin(s) and diluent can be formed into a polyolefin, the selection of diluent (or process solvent, or "P-sol") is not critical. The P-sol is preferably a solvent that is liquid at room temperature. In an embodiment, the diluent (or solvent) can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In an embodiment where it is desired to obtain a cooled extrudate having a stable liquid solvent content, non-volatile liquid solvents such as liquid paraffin can be used, either alone or in combination with other solvents. In an embodiment, the specific gravity of solvent is no more than 1.4, or no more than 1.3, or no more than 1.1, because the liquid solvents having a specific gravity in this range are relatively easy to recycle and reuse. Consequently, liquid paraffin can be used because the specific gravity of liquid paraffin is in the range of from about 0.83 to about 0.89.

The viscosity of the P-sol is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the P-sol from the microporous polymer membrane.

(2) Preparing the Polyolefin Solution

The polyolefin solution can be produced by combining the polyolefin with the first solvent (also called diluent, P-sol, or process solvent). The method selected for preparing a solution is not critical. For example, the polymer resin(s) as described above can be combined, e.g., by melt blending, with at least one P-sol to prepare a polymer solution. The resin(s) and P-sol(s) can be added sequentially, in parallel, or in a combination thereof. The method for combining the polyolefin resin or resins and P-sol is not critical, and e.g., conventional mixing methods can be used. Optionally, the polyolefin solution can contain various additives such as one or more antioxidant, fine silicate powder (pore-forming material), etc., provided these are used in a concentration range that does not significantly degrade the desired properties of the microporous polymer membrane.

When melt-blending is used, the melt-blending temperature is not critical. For example, the temperature of the polyolefin solution during melt-blending (the melt-blending temperature) can range, e.g., from about 10° C. higher than the melting point Tm of the polyethylene resin to about 120° C. higher than Tm. For brevity, such a range can be represented as (Tm+10° C.) to (Tm+120° C.). In an embodiment where the polyethylene resin has a melting point of about 130° C. to about 140° C., the melt-blending temperature can range from about 140° C. to about 250° C., or from about 170° C. to about 240° C. The melting point is measured by differential scanning calorimetry (DSC) according to JIS K7121.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). Although it is not a critical parameter, the cylinder (or bore) of the double-screw extruder can have an inner diameter of in the range of about 40 mm to about 100 mm, for example.

The amount of the polyolefin composition in the polyolefin solution is not critical. In an embodiment, the amount of polyolefin composition in the polyolefin solution can range from about 1 wt. % to about 75 wt. %, based on the weight of the polyolefin solution, for example from about 20 wt. % to about 70 wt. %. Although the amount of polyolefin composition in the polyolefin solution is not critical, when the amount is less than about 1 wt. %, it can be more difficult to produce the microporous polyolefin membrane at an acceptably efficient rate. Moreover, when the amount is less than 1 wt. %, it can be more difficult to prevent swelling or neck-in at the die exit during extrusion, which can make it more difficult to form and support the cooled polymer extrudate. On the other hand, when the amount of polyolefin composition solution is greater than about 75 wt. %, it can be more difficult to form the cooled polymer extrudate.

(3) Extruding the Polyolefin Solution and Optionally Cooling the Extrudate

The polyolefin solution can be extruded to form the extrudate. The extrudate is further processed to form the microporous membrane.

In an embodiment, at least a portion of the polyolefin solution is extruded through at least one die in order to form an extrudate. For example, the polyolefin solution can be extruded and then conducted directly from a first extruder to the die. In an alternative embodiment, additional extruders (second, third, etc.) can be used. The additional extruders can be connected in series and/or parallel with the first extruder. The product of the first extruder can be cooled and then pelletized. Subsequently, the pellets can be, e.g., melt-blended and extruded through a second extruder and a die to make the gel-like molding or sheet. The selection of die geometry is not critical. For example, the die can be a sheet-forming die having a rectangular orifice, a double-cylindrical, hollow die, an inflation die, etc. The die gap is not critical. In the case of a sheet-forming die, the die generally has a gap of about 0.1 mm to about 5 mm. The temperature of the polyolefin solution during extrusion (the extrusion temperature) is not critical, and generally ranges from about 140° C. to about 250° C. The extruding speed is not critical, and generally ranges from about 0.2 m/minute to about 15 m/minute.

If desired, the extrudate can be cooled to form a cooled extrudate. Cooling can be conducted until the polyolefin extrudate reaches the extrudate's gelation temperature (i.e., the temperature at which the polymer extrudate sheet begins to gel) at a cooling rate of at least about 50° C./minute. In an embodiment, the polyolefin extrudate is cooled to a temperature of about 25° C. or lower.

(4) Optionally Stretching the Extrudate

If desired, the cooled polymer extrudate which is generally in the form of a gel-like molding or sheet can be stretched in at least one planar direction (i.e., a direction in the plane of the extrudate) to form a stretched sheet. This step is optional. Neither the choice of stretching method nor the degree of stretching magnification are particularly critical. While the choice is not critical, the stretching can be conducted monoaxially or biaxially. Monoaxial stretching involves stretching the cooled polymer extrudate in one planar direction, e.g., either the machine (i.e., longitudinal) direction or the transverse direction. Biaxial stretching involves stretching the cooled polymer extrudate in two planar directions, e.g., both the machine direction and transverse direction. In this context, the machine direction is a direction in the plane of the film (the cooled polymer extrudate in this instance) which is oriented approximately along the direction of travel as the film is formed, i.e., the longest axis of the film during production. The transverse direction also lies in the plane of the film and is approximately perpendicular to both the machine direction and a third axis approximately parallel to the thickness of the film.

Though not critical, the temperature of the cooled polymer extrudate during stretching (the "stretching temperature") can be about (Tm+10° C.) or lower. Optionally, the stretching temperature is in a range that is higher than Tcd but lower than Tm, wherein Tm is the melting point and Tcd is the crystal dispersion temperature of the polyolefin used to make the polyolefin solution. In an embodiment, when using polyethylene single component or polyethylene containing composition as a polymer, the stretching temperature ranges from about 90° C. to about 140° C., or about 100° C. to about 130° C.

The second polyethylene, and the combined first and second polyethylene composition generally have a Tm of about 130° C. to 140° C. and Tcd of about 90° C. to 100° C. Tcd can be determined from the temperature characteristics of the kinetic viscoelasticity measured according to ASTM D-4065.

Optionally, stretching can be conducted in the presence of a temperature gradient in a thickness direction (i.e., a direction approximately perpendicular to the planar surface of the microporous polyolefin membrane). The stretching can be conventional, e.g., as described in JP3347854 B2.

[2] Removing the Diluent from the Extrudate to Form the Microporous Membrane

In an embodiment, the following steps are used for removing the first solvent (i.e., P-Sol in this case) from the extrudate.

In the first step, called step (A), the extrudate contacts a second solvent in a first stage (i.e., the washing stage) to remove at least a portion of a P-sol from the extrudate. The second solvent comprises (or consists of or consists essentially of) at least one chlorinated hydrocarbon (abbreviated as "CHC"). In an embodiment, the second solvent comprises a major amount (more than 50% by weight based on the weight of the second solvent) of CHC and further comprises at least one hydrofluoroether (abbreviated "HFE"). For example, the second solvent can be an azeotrope of CHC and HFE. While the second and third solvents are described in terms of CHC and HFE, they are not limited thereto. Any combination of washing and rinsing solvents can be used which are effective for removing the selected P-sol from the extrudates provided the second and third solvents when combined exhibit a "UCST (Upper Critical Solution Temperature)"-type phase diagram.

In a second step, called step (B), the extrudate from step (A) contacts a third solvent in a second stage (i.e., the rinsing stage).

In a third step (C), a first stream comprising P-sol and CHC is conducted away from the first stage to prevent accumulation of P-sol in the second solvent in the first stage. The first stream can further comprise HFE. A second stream comprising HFE and CHC is conducted away from the second stage to prevent accumulation of CHC in the second stage.

In step (D), the first and second streams can be combined, and the P-sol can be separated from the combined streams. Alternatively, at least a portion of the P-sol can be separated from the first stream with the remaining CHC/HFE after P-sol separation available for storage or conducting to the first stage for recycle and re-use. In either case, the separated P-sol is available for recycle and re-use to produce the polyolefin solution. Either the combined first and second streams or the second stream only is then conducted to step (E) for CHC—HFE separation.

In step (E) the selected HFE-CHC stream from step (D) is cooled to make an HFE-rich phase and a CHC-rich phase. The amount of cooling is selected to provide the desired concentration of FIFE in the HFE-rich phase and the desired concentration of CHC in the CHC-rich phase. For example, in one embodiment relating to a continuous process for producing a microporous membrane, the amount of cooling of the combined first and second streams is selected to provide (I) a CHC-rich phase containing at least as high a CHC content as in the first stream and/or (II) an FIFE-rich phase having at least as high an HFE content as in the second stream. A portion of the CHC-rich phase can be purified, and a relatively pure CHC recycled to the first stage for re-use when a relatively high concentration of CHC is desired for the first stage. A portion of the HFE-rich phase can be purified, and a relatively pure HFE recycled to the second stage for re-use when a relatively high concentration of HFE is desired for the second stage. Accordingly, the process can further comprise at least one step (F) selected from the group of the following (F)(a)-(F)(d):

(a) conducting at least a portion of the CHC-rich phase from step (E) to step (A);
(b) conducting at least a portion of the HFE-rich phase from step (E) to step (B);
(c) (i) separating a first and second product, from the CHC-rich phase of Step (E) wherein the first product comprises relatively pure CHC and the second product comprises at least a portion of the remainder of the CHC-rich phase of step (E) following separation of the first product, and then carrying out the steps of
  (c)(ii) conducting at least a portion of the first product to step (A); and/or
  (c)(iii) conducting at least a portion of the second product to at least step (A) and/or step (E);
(d) (i) separating a third and fourth product from the HFE-rich phase of step (E) wherein the third product comprises relatively pure FIFE and the fourth product comprises at least a portion of the remainder of the FIFE-rich phase of step (E) following separation of the third product, and then carrying out the steps of (d) (ii) conducting at least a portion of the third product to step (B); and/or (d) (iii) conducting at least a portion of the fourth product to steps (A) and/or (E).

As might be appreciated, the second and fourth products can be an azeotropic mixture of CHC and HFE, which can be recycled to extinction in step (E).

In an embodiment, the process optionally can further comprise drying the extrudate to remove at least some of the HFE following step (B).

By way of exemplification, the following embodiments describe how the P-sol removal step of the invention can be integrated in various forms into a wet process for producing a microporous membrane. Both of the exemplified embodiments begin by conducting steps (A) through (E) as described above, steps (F) will be described in detail for each case.

(1) First Embodiment

Figure 2:
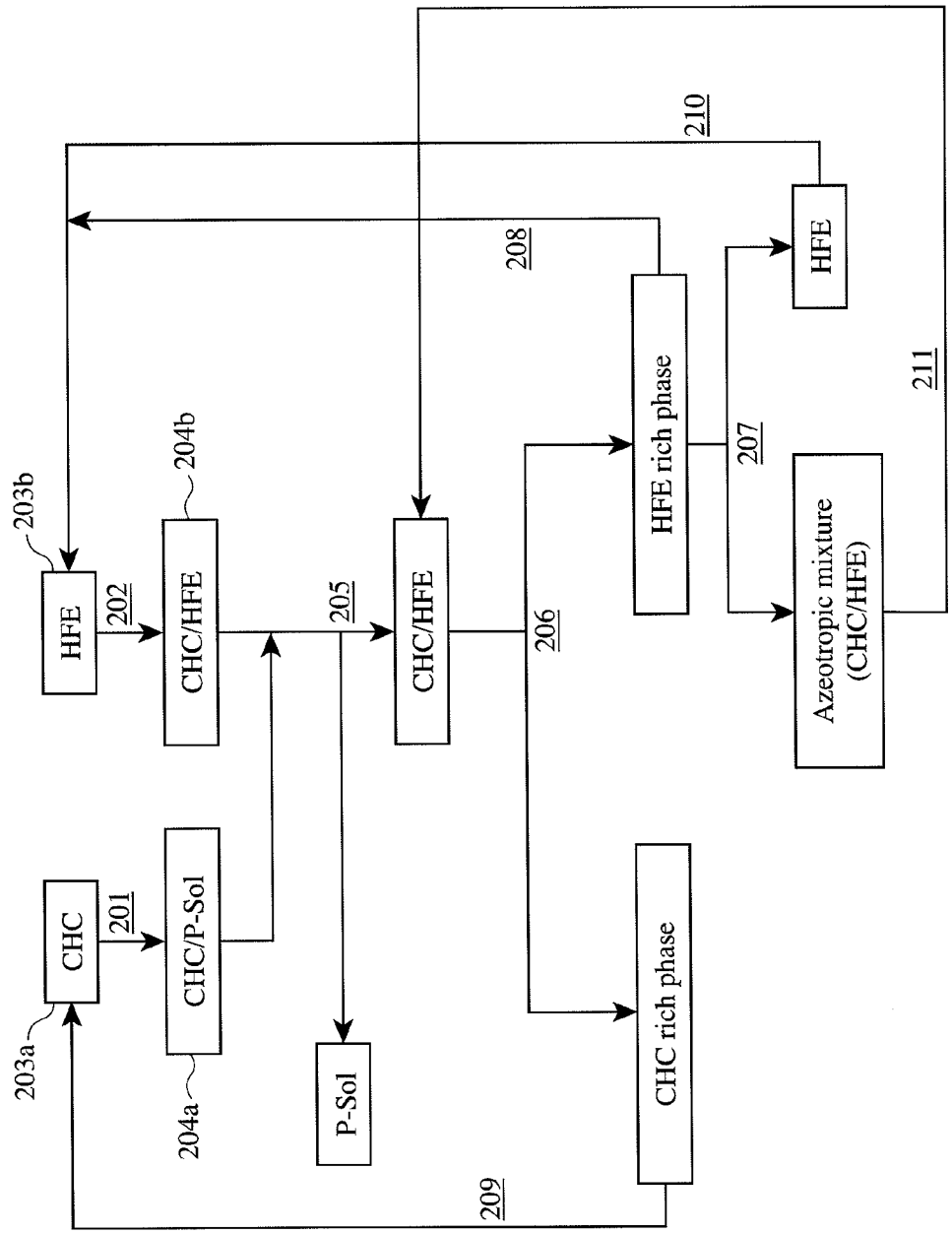
FIG. 2 schematically shows an embodiment where a porous polymeric extrudate which contains a first solvent (P-Sol) in the extrudate, is contacted with a second solvent (comprising CHC) in a first stage, and the washed extrudate contacts a third solvent (comprising FIFE) in a second stage. A first stream comprising CHC and P-sol is conducted away from the first stage and a second stream comprising HFE and CHC is conducted away from the second stage. The first and second streams are combined, and the combined stream is cooled to separate a CHC-rich phase from and HFE-rich phase. The CHC-rich phase can be recycled to the first stage for re-use, and the HFE-rich phase can be recycled to the second stage for re-use. P-sol can be separated from the first stream or the combined stream if desired. As shown, the HFE-rich phase can be further separated (e.g., by distillation) into an azeotrope of CHC and HFE and HFE. The azeotrope can be recycled to the cooling step (for extinction) if desired. The HFE can be recycled to the rinsing stage, as shown FIG. 3 schematically shows a process that is similar to the process of FIG. 2, except that in this case the CHC-rich phase is further separated into CHC and an azeotrope of HFE and CHC. The CHC can be recycled to the washing stage and the azeotrope can be recycled to the cooling stage, either alone or in combination with the azeotrope from the HFE distillation as shown.

The first embodiment, shown schematically in FIG. 2, comprises steps (A) through (D) as described above, and further comprises at least one of step (F)(a), Step (F)(b), Step (F)(d)(i) with Step (F)(d)(ii) and/or Step (F)(d)(iii). (201) is a washing stage, and (202) is a rinsing stage, (203a, 203b) shows solvents, and (204a, 204b) shows waste solvents from each step of (201) and (202), (205) is separation step in order to obtain purified P-Sol. (206) is a cooling separation step in order to obtain CHC-rich phase and HFE-rich phase. (207) is an azeotropic distillation step in order to obtain pure HFE and an azeotrope of CHC and HFE.

In this embodiment, at least a portion of the first solvent (P-sol in this case) is removed (or displaced) from the polymer extrudate in the first stage (also called the "washing stage") by a second solvent in order to form a solvent-removed polymer extrudate. Optionally, the extrudate can be stretched and/or cooled before washing. In the first stage, at least a portion of the P-sol is removed from the extrudate, generally from the pores of the extrudate. The second solvent or "washing" solvent can be CHC or a mixture of CHC and HFE (including an azeotrope of HFE and CHC) which is capable of removing (or washing away, or displacing) a portion of the P-sol from the extrudate. The washed extrudate is then conducted to a second stage (also called a rinsing stage) where, e.g., a portion of the residual CHC (if any is present) can be removed from the extrudate by contacting the washed extrudate with a third solvent (also called a "rinsing" solvent). The washing step (Step (A)); the rinsing step (Step (B)), and Steps (C), (D), (E), and (F) all of which relate to concentrating and recycling CHC and HFE individually or in combination, will now be described in more detail.

(A) Washing Stage

In one embodiment, the second solvent comprises one or more chlorinated hydrocarbon species, referred to as CHC. e.g., the second solvent can be dichloromethane (DCM). In another embodiment, the second solvent comprises CHC and one or more species of hydrofluoroether, referred to as HFE. In the washing stage, the second solvent is used to remove or displace the P-sol from the extrudate. Since CHC such as DCM is generally superior for washing compared to HFE, and since HFE is generally superior for drying compared to CHC, in one embodiment the second and third solvents are independently selected mixtures of CHC and HFE. The second solvent can comprise, e.g., 50 wt. % or more of CHC and 50 wt. % or less of HFE, based on the weight of the second solvent. In another preferable embodiment, the second solvent comprises CHC in an amount of about 70 wt. %. or more.

The amount of HFE in the second solvent, when present, is generally less than 50 wt. %, or less than 30 wt. %, based on the weight of the second solvent.

The washing solvent can contain one or more HFE species and one or more CHC species, and the choice of HFE and CHC species is not critical provided the CHC—HFE mixture can form an azeotropic composition. An azeotropic composition of HFE and CHC (e.g., an azeotrope consisting of or consisting essentially of CHC and HFE) is particularly effective for removing P-sol like liquid paraffin from the extrudate, and, consequently, the first washing solvent can be an azeotrope of HFE and CHC.

Accordingly, in an embodiment, the washing solvent comprises one or more chlorinated hydrocarbon species, referred to as CHC. The choice of CHC species is not critical, and can be, e.g., one or more of dichloromethane (DCM), trichloromethane, tetrachloromethane, 1,1-dichloroethane, 1,2-dichloroethane, trichloroethane. In an embodiment, the second solvent is also desirable a mixture comprising a major amount of CHC and a minor amount of HFE because CHC has a good washing capability compared with washing HFE. In a preferable embodiment, the second solvent is desirable to include CHC more than 50 wt. %, more preferably to include CHC more than 70 wt. %. Conversely, the second solvent is desirable to include HFE less than 50 wt. %, more preferably to include HFE more than 30 wt. %.

Figure 4:
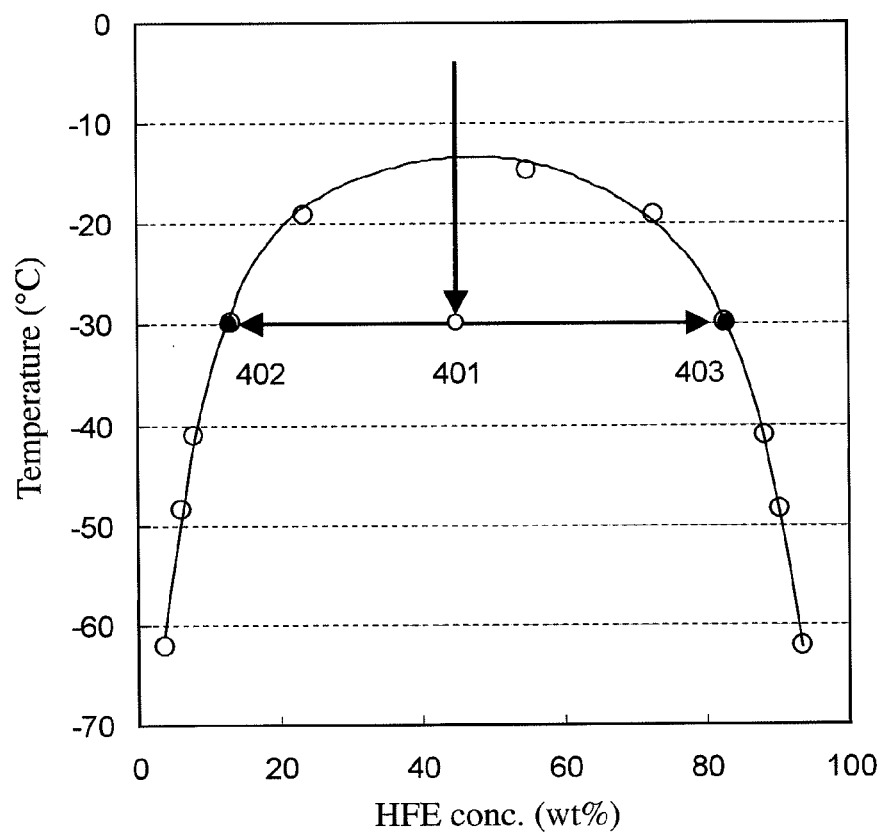
FIG. 4 shows the Phase Diagram of a binary mixture of $DCM/C_4F_9OCH_3$, and shows how the azeotrope (or any other isotropic mixture) of $DCM/C_4F_9OCH_3$ can be broken down into a portion rich in DCM and a portion rich in $C_4F_9OCH_3$.
Figure 5A:
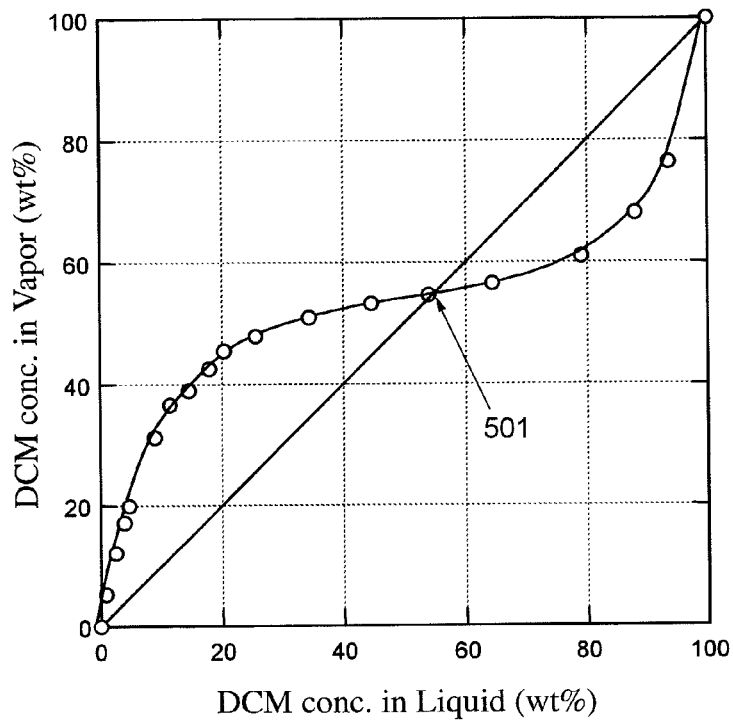
FIG. 5 (a) shows the Vapor-Liquid Equilibrium Diagram for a binary mixture of $DCM/C_4F_9OCH_3$ measured at 101.8 kPa.
Figure 5B:
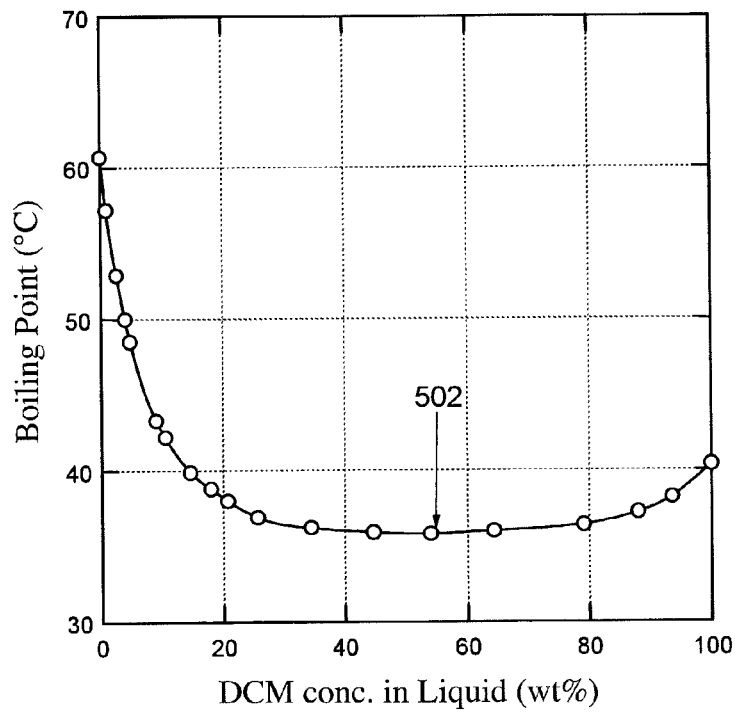

In an embodiment, the CHC can be, e.g., one or more of dichloromethane (DCM), trichloromethane, tetrachloromethane, 1,1-dichloroethane, 1,2-dichloroethane, trichloroethane; and the HFE can be, e.g., one or more of $C_4F_9OC_2H_5$ and $C_6F_{13}OCH_3$. In one embodiment, the CHC is dichloromethane, and the HFE is $C_4F_9OCH_3$. The composition of dichloromethane (DCM) and $C_4F_9OCH_3$ (HFE7100 (trade mark of 3M)) forms an azeotropic composition 501 and 502, as shown in FIG. 5. The composition of 54.8 wt. % of DCM and 45.2 wt. % of $C_4F_9OCH_3$ on the basis of total volume of DCM and $C_4F_9OCH_3$, has an azeotropic boiling point of 35.8° C. The second solvent can comprise 54.8 wt. % of DCM and 45.2 wt. % of $C_4F_9OCH_3$ based on the total weight of DCM and $C_4F_9OCH_3$ in the second solvent. As shown in FIG. 4, this composition can be characterized by UCST diagram, i.e., one exhibiting an upper critical solution temperature or "UCST". When a solvent composition is characterized by an UCST phase diagram, the composition is homogeneous at a relative higher temperature, and the composition separates two phases at a relative lower temperature. Consequently, when the composition is cooled to a temperature below the UCST, the composition separates into two phases. In the case of FIG. 4, when the composition (401) of DCM and $C_4F_9OCH_3$ is cooled to lower than about −15° C., the composition separates into a DCM rich phase and a $C_4F_9OCH_3$ rich phase. For example, when the composition (401) of DCM and $C_4F_9OCH_3$ is cooled to −30° C., the composition separates into the DCM rich phase (402) and $C_4F_9OCH_3$ rich phase (403). In an embodiment, the chlorinated hydrocarbons and hydrofluoroethers can have a boiling point in the range of from about 30° C. to about 95° C., which is a convenient range for use as the washing solvent in the washing step.

The method of contacting the extrudate (i.e., washing the P-sol) with the second solvent is not critical. Any method capable of removing a significant amount of P-sol can be used, including conventional solvent-removal methods. For example, an extrudate or stretched extrudate, or cooled extrudate can be washed by immersing the sheet in the washing solvent and/or showering the sheet with the washing solvent. When a significant amount of P-sol remains in the washed extrudate, it can be more difficult to remove P-sol in a rinsing stage hereinafter and to produce a membrane of the desired porosity. Consequently, if reduced porosity is observed, additional washing cycles should be conducted until the remaining P-sol is removed.

Although it is not necessary to do so, before contacting the polymer extrudate with the washing solvent, the polymer extrudate can be conducted to contact at least one first sealing solvent. This step is defined as a "first sealing step". The first sealing step is optional. Contacting the polymer extrudate with at least one first sealing solvent can be used to prevent the release of washing solvent vapor into the air. The first sealing solvent, when used, should be immiscible with the P-sol to reduce the risk releasing a portion of the washing solvent into the air. Although it is not necessary, the first sealing solvent can be immiscible with the washing solvent, e.g., the first sealing solvent can have a solubility amount of no more than 5 wt. % for the washing solvent, or no more than 4 wt. % for the washing solvent. In an embodiment, a density of the first sealing solvent can be lighter than that of the washing solvent, although it is not critical. In an embodiment, the first sealing solvent can be water, N,N-dimethylformamide, or mixtures thereof.

(B) A Rinsing Stage

A rinsing stage comprises contacting the washed extrudate from step (A) with a third solvent with a mixture of FIFE and CHC to form a second stream of HFE and CHC.

The choice of third solvent is not critical, provided the third solvent is capable of removing at least a portion of the CHC remaining in the extrudate after step (A). In an embodiment, the third solvent comprises HFE. In an embodiment, the HFE can be one or more of a $C_4F_9OCH_3$, $C_4F_9OC_2H_5$ and $C_6F_{13}OCH_3$. In another embodiment, the third solvent is HFE and CHC, preferably a major amount of HFE and a minor amount of CHC. Consequently, the third solvent has an HFE content of more than 50 wt. %, or more than 70 wt. %. When the third solvent contains CHC, the amount of CHC should be less than 50 wt. %, or less than 30 wt. %, based on the weight of the third solvent.

The method selected for contacting the washed extrudate with the third solvent is not critical. Any method capable of removing a significant amount of the CHC remaining on the extrudate after the first stage can be used, including conventional solvent-removal methods. For example, the washed extrudate can be rinsed by immersing the sheet in the third solvent and/or showering the sheet with the third solvent. It might be appreciated that the relative amount of HFE in the rinsed extrudate is not a significant feature of the process because HFE can easily be removed by a subsequent drying step since HFE is quite volatile.

In an embodiment, the second stream has a UCST (Upper Critical Solution Temperature) which in this case is the temperature at which the second stream separates into a HFE-rich phase and a CHC-rich phase. A composition comprising CHC and HFE has a UCST as shown FIG. 4, where the CHC is DCM, and the HFE is $C_4F_9OCH_3$. As shown in the figure, when the CHC and HFE composition is cooled to a temperature of about $-30°$ C., the composition phase separates into an HFE rich phase comprising about 82 wt. % of HFE and about 18 wt. % of CHC, and a CHC rich phase comprising about 88 wt. % of CHC and about 12 wt. % of HFE are formed. In a preferable embodiment, the CHC can be DCM, and the HFE can be $C_4F_9OCH_3$.

(C) Conducting a First Stream Away from the First Stage, and/or Conducting a Second Stream Away from the Second Stage, and Separating the First Solvent from the First Stream, the Second Stream, or Both In part to prevent the accumulation of P-sol in the second solvent, a first effluent (also called a first stream or first effluent stream) comprising P-sol and CHC (and optionally HFE) is conducted away from Step (A). Since a portion of the second solvent is conducted away from the washing stage, fresh or recycled CHC (and optionally HFE) can be conducted to the washing step to replenish the second solvent. Since a mixture of HFE and CHC has a UCST phase diagram, when the second solvent comprises CHC and HFE in the first stream can be separated into an HFE-rich phase and a CHC-rich phase by cooling as described in the discussion of Step (E).

After contacting the polymer extrudate (i.e., washing the P-sol), the washing step's effluent of P-sol, HFE and CHC (i.e., the first stream) can optionally be collected in the first storage region. For example, a vessel (or tank) is suitable for storing the washing step's effluent. A tank used for storing the washing stage's effluent can be called a "first tank".

In part to prevent the accumulation of CHC in the rinsing solvent, an effluent stream of HFE and CHC is conducted away from the rinsing stage. This effluent stream can be referred to as the second stream or second effluent stream to distinguish it from the washing stage's effluent stream. The second stream comprises HFE and CHC. In an embodiment, the second stream is conducted to, and collected in, a second storage region, which, like the first storage region, can be, e.g., a tank or vessel. When a tank is used as the second storage region, it is referred to as the "second tank" to distinguish it from the first tank used to store the first stream.

P-sol is separated from the each stream to make an HFE-CHC stream. The method of the separation is described in step (D) in details.

After contacting the washed polymer extrudate with the third solvent in the rinsing stage, the polymer extrudate can be dried to remove at least a portion of any remaining volatile species from the extrudate. This step is optional. For example, the washed polymer extrudate can be dried by a heat-drying method, a wind-drying (moving air) method, etc. The drying temperature is not critical, and can be, e.g., equal to or lower than the above Tcd, or optionally $5°$ C. or more lower than the Tcd (ASTM D-4065). For example, UHMWPE or a polyethylene composition of UHMWPE and HDPE generally has crystal dispersion temperatures in the range of about 90 to about $100°$ C. Drying is conducted until the remaining washing solvent (and/or) rinsing solvent becomes preferably 5 wt. % or less, more preferably 3 wt. % or less, per on the basis of 100 wt. % of the microporous polymer membrane.

After drying, the dried polymer extrudate can be contacted with at least one second sealing solvent to prevent releasing vapors of the washing solvent and rinsing solvent into the air. This step is optional, but when used it is called a "second sealing step". While in an embodiment the second sealing solvent is immiscible with the washing solvent and rinsing solvent, this is not required. For example, in one embodiment the second sealing solvent has a solubility amount of no more than 5 wt. % in the washing solvent and/or rinsing solvent, or no more than 4 wt. % for the washing solvent and/or rinsing solvent. In an embodiment, a density of the second sealing solvent can be lighter than that of the washing solvent, although it is not critical. In an embodiment, the second sealing solvent can be water, $C_4F_9OCH_3$, $C_4F_9OC_2H_5$, N,N- dimethylformamide (DMF) or thereof, although the second sealing solvent depends on what kind of washing solvent is used.

It can be advantageous to provide additional vapor barriers between the washing stage, the rinsing stage, and stages upstream of the washing stage and downstream of the rinsing stage. For example, it can be advantageous to contact the rinsed polymer extrudate with at least one third sealing solvent. The third sealing solvent when used should have similar properties to the first and second sealing solvent, although it can be independently selected. In an embodiment, the third sealing solvent can be water, $C_4F_9OCH_3$, $C_4F_9OC_2H_5$, N,N-dimethylformamide (DMF), or mixtures thereof, although the choice of a particular third sealing solvent can depend on the washing solvent selected for the process. The first, second, an/or third sealing steps can be conducted in a closed system.

(D) Combining the First and Second Waste Streams and then Separating the P-Sol from the Combined Streams to Make an HFE-CHC Stream Turning again to FIG. 2, the first and second streams are combined and then P-sol is separated (205) from the combined streams to make an HFE-CHC stream. The method selected for combining the first and second waste streams is not critical. The method selected for separating the P-sol from the combined streams to make an HFE-CHC stream is not critical. In an embodiment, when using a liquid paraffin as a P-sol, fractional distillation of the combined streams can be used for the separation because an HFE and a CHC has lower boiling point than P-sol. For example, liquid paraffin (a suitable P-sol) has an atmospheric boiling point of greater than 200° C. Since HFE and CHC are relatively easy to boil, a residue liquid after distillation of the combined stream is primarily P-Sol (e.g., a liquid paraffin). When using liquid paraffin as a P-sol, DCM as CHC, and $C_4F_9OCH_3$ as HFE, the fractional distillation temperature can be from 40° C. to 90° C. at atmospheric pressure. When using liquid paraffin as a P-sol, the liquid paraffin can be separated by gravity from the first stream or the combined first and second stream because the specific gravity of liquid paraffin (from 0.83 to 0.87) is smaller than that of the of CHC and CHC—HFE (from 1.3 to 1.6). While the P-sol can be separated from the combined first and second streams by gravity separation, this method might not be advantageous because the P-sol is miscible in the combined HFE-CHC streams. While fractional distillation can be used to separate P-sol from the combined streams, this method generally can't be used to separate CHC from HFE. Fractional distillation is generally not suitable for separating CHC or HFE from a CHC—HFE mixture because CHC and HFE form an azeotrope containing a significant amount of CHC and HFE, as shown in FIG. 5.

Separated P-sol is conducted away from Step (D), and is available, e.g., for storage or recycle and re-use in forming polyolefin solution. Following P-sol separation, the combined first and second streams are referred to as a third stream. The third stream is then conducted to the cooling step, Step (E) (206).

(E) Cooling the Third Stream, which Comprises HFE and CHC to Make an HFE-Rich Phase and a CHC-Rich Phase The boiling point and gravity of HFE and CHC are very close, and the HFE and CHC in the third stream can form an azeotropic composition, as shown in FIG. 5. For example, when the composition of the third stream is 30 to 70 vol % of HFE and 30 to 70 vol % of CHC based on the total volume of the third stream, fractional distillation of the third stream cannot be used to separate a CHC-rich or HFE-rich streams from the third stream. To overcome this difficulty, use is made of the fact that the composition of HFE-CHC has a UCST phase diagram. For example, as shown in FIG. 4, the composition of HFE-CHC (e.g., $C_4F_9OCH_3$/DCM composition) has a UCST of about −14° C. Consequently, it is relatively straightforward to separate a HFE-rich phase (403) and a CHC-rich phase (402) from the third stream (401) by cooling at the third stream to a temperature of no more than about −14° C., or to a temperature in the range of from about −20° C. to about −50° C. For example, as shown in FIG. 4, in case of an azeotrope of HFE-CHC (401), the composition separates FIFE-rich phase (403) (content of HFE; 85 wt. %) and CHC-rich phase (402) (content of HFE; 15 wt. %) by cooling at the temperature of −30° C. In one embodiment, the cooling temperature can be adjusted to the temperature so that the composition of the HFE-rich phase is the same as that of the rinsing solvent and the composition of the CHC-rich phase is the same as that of the washing solvent. In this case, shown in FIG. 2, a portion of the HFE-rich phase can be conducted to Step (B) (208) to replenish the rinsing solvent and a portion of the CHC-rich phase can be conducted to step (A) (209) to replenish the washing solvent.

Even if the composition of the CHC-rich phase is different from that of the washing solvent, the composition of the CHC-rich phase can recycled for reuse as the washing solvent by adding "make-up" CHC or HFE in order to adjust the composition to the washing solvent. Consequently, further purification of the CHC-rich phase is not necessary but is optional. Likewise, even if the composition of the HFE-rich phase is different from that of the rinsing solvent, the composition of the HFE-rich phase can recycled for reuse as the rinsing solvent by adding "make-up" CHC or HFE in order to adjust the composition to that of the rinsing solvent. Consequently, further purification of the HFE-rich phase is not necessary but is optional. Accordingly, CHC or HFE can be added to the HFE-rich phase before it is conducted to Step (B), in order to adjust the composition of the HFE-rich phase before it is added to the rinsing solvent of Step (B). Similarly, either CHC or HFE can be added to the CHC-rich phase before it is conducted to Step (A), in order to adjust the composition of the CHC-rich phase before it is added to the washing solvent of Step (A). In one embodiment, the temperature of the third stream during cooling is selected so that the CHC-rich phase and the HFE-rich phase can be conducted to Step (A) and Step (B) respectively without adjusting the composition of either phase or both. This reduces the need for expensive "make-up" washing or rinsing solvents. For example, when the washing solvent comprises (or consists of or consists essentially of) of about 85 wt. % of DCM and about 15 wt. % of $C_4F_9OCH_3$, the cooling temperature can be adjusted to −30° C., since DCM-rich phase is the same composition as the washing solvent. If the washing solvent comprises greater than about 85 wt. % of DCM, the cooling temperature can be adjusted into the range of about −30° C., to about −50° C. If the washing solvent has a composition in the range of about 50 wt % to about 85 wt. % of DCM based on the weight of the washing solvent, the cooling temperature can be in the range of about −15° C. to about −30° C. The minimum cooling temperature is generally −50° C. or warmer for a third stream comprising DCM and $C_4F_9OCH_3$.

The cooling method selected for Step (E) is not critical as long as the phase separation of the HFE-CHC stream occurs. Conventional cooling method can be used in this step. For example, a conventional freezing machine or a conventional refrigerator can be used. The choice of cooling media is not critical. In an embodiment, in case cooling the HFE-CHC stream at the temperature in the range of no less than −30° C., ammonium, 2-methylpropane or carbon dioxide can be used as a cooling media. In an embodiment, in case cooling the HFE-CHC stream at the temperature in the range of below −30° C., liquid nitrogen or liquid argon can be used as a cooling media.

The HFE-rich and CHC-rich phases can be, e.g., conducted away from the process, further processed (e.g., further purified), recycled for re-use in the process, or stored. When the HFE-rich phase and the CHC-rich phase are stored, any convenient method can be used, e.g., a fourth tank or vessel for the HFE-rich phase and a fifth tank or vessel for the CHC-rich phase. In this case, since specific gravity of HFE is heavier than that of CHC, the HFE-rich stream forms a lower stream, and the CHC-rich stream forms an upper stream. Consequently, the lower stream passes through the pipe line to the fourth tank, and the upper stream passes through the pipe line to the fifth tank.

(F) Processing the CHC-Rich and HFE-Rich Phases

Figure 3:
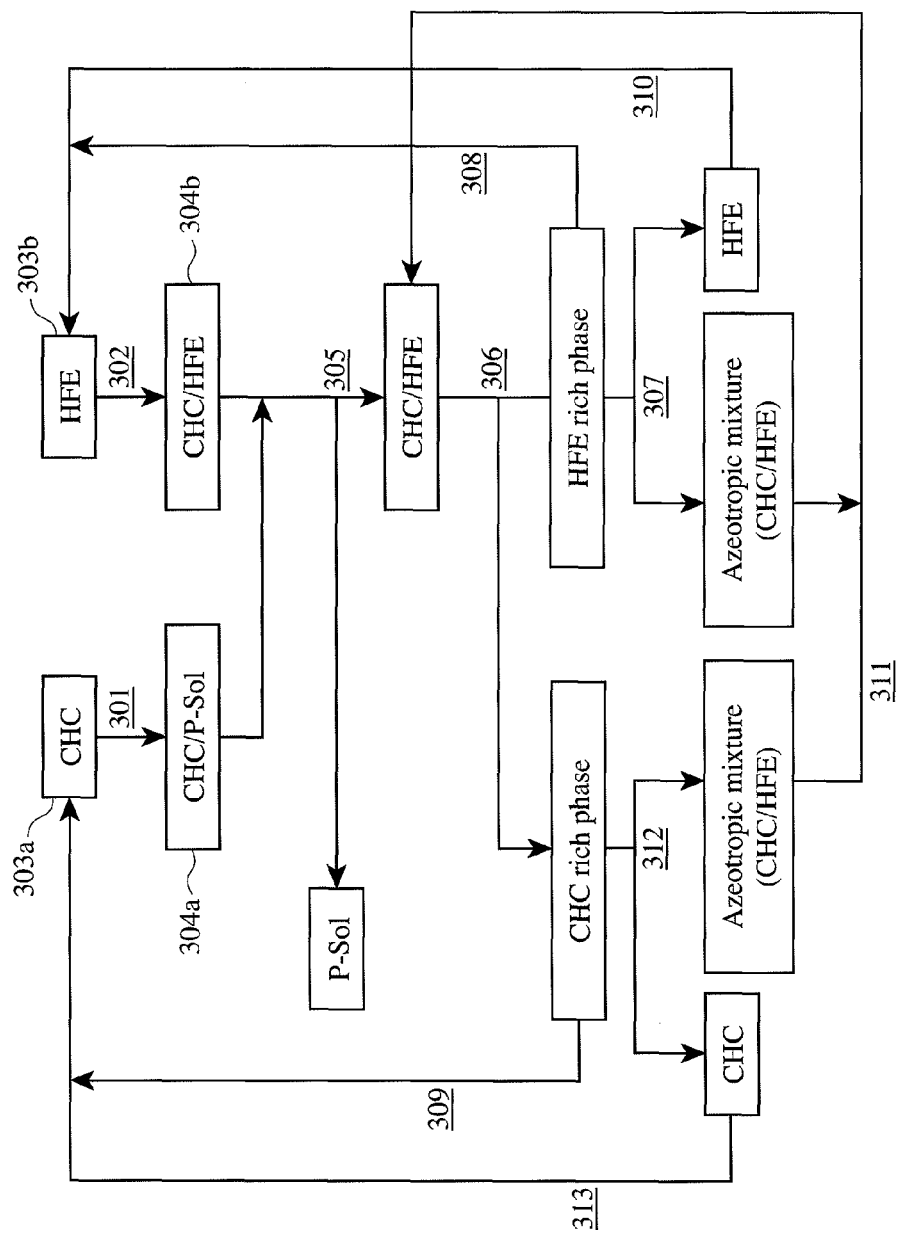

In an embodiment, at least a portion of the CHC-rich phase is conducted to Step (A) (209 in FIG. 2, 309 in FIG. 3) and/or at least a portion of the HFE-rich phase is conducted to Step (B) (208 in FIG. 2, 308 in FIG. 3). The method for conducting the CHC-rich phase to step (A) or the HFE-rich phase to Step (B) is not critical.

Figure 6:
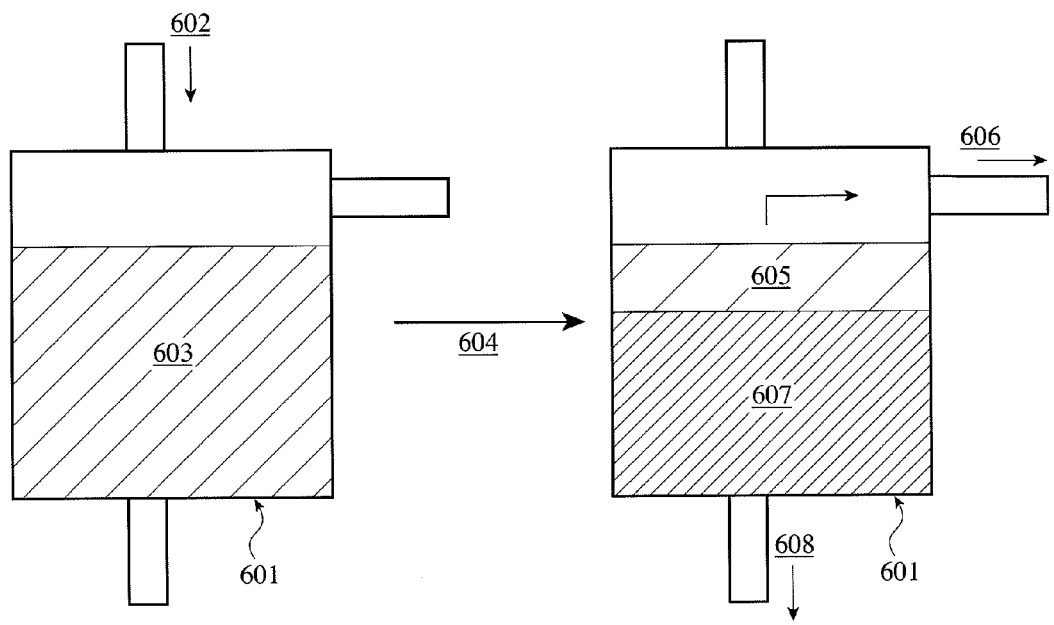
FIG. 6 schematically shows an embodiment where the HFE-rich phase is conducted away from the cooling step to a purification region where the HFE-rich phase is heated to separate a third product (purified HFE) and a fourth product (an azeotrope of CHC and FIFE) from the HFE-rich phase.

In an embodiment, a relatively high concentration of HFE in rinsing stage is desirable, particularly since the relatively high vapor pressure HFE makes it relatively easy to conduct the drying of Step (C). In this embodiment, the amount of HFE in the third solvent ranges from about 85 wt. % to about 100 wt. %, based on the weight of the third solvent. Consequently, after cooling the third stream to make an HFE rich phase, it can be desirable to separate relatively a third product comprising relatively pure HFE from the FIFE-rich phase, as described above in Step (F)(d)(i), (ii), and (iii). Accordingly, a fourth product comprising, e.g., an HFE-CHC azeotrope can also be separated from the HFE rich phase, if desired, and at least a portion the fourth product of conducted to Step (E) (211 in FIG. 2). At least a portion of a third product comprising the relatively pure HFE can be conducted to the rinsing stage (210 in FIG. 2, 310 in FIG. 3) to replenish at least a portion of the third solvent that is conducted away with the second stream. In this context, the term "relatively pure" means the amount of HFE in the relatively pure HFE is about 95 wt. % or more, based on the weight of the relatively pure HFE. A method for separating the relatively pure HFE from the FIFE rich phase is not critical. For example, distillation of the FIFE rich phase can be conducted as shown in FIG. 6. According to the figure, the HFE rich phase (602) is conducted to a separation zone (601) (e.g., a vessel or tank), and the HFE rich phase (603) heated (604) to a temperature in the range of from about boiling point of the HFE-CHC azeotrope to about the boiling temperature of HFE. For example, when used a mixture of DCM and $C_4F_9OCH_3$ as a washing solvent, the temperature of the HFE-rich phase during separation can be ranges from about 35.8° C. to about 40° C. at atmospheric pressure. When the HFE rich phase is distilled, and at least a portion of a fourth product comprising a vapor comprising the HFE-CHC azeotrope (605) can conducted away as an overhead stream (606) from the separation zone, and at least a portion of a third product (608) comprising a relatively pure HFE (607) can be conducted away from a lower region of the separation zone, as shown in FIG. 6.

As might be appreciated, Steps (A) through (F) can be operated continuously, semi-continuously, or in batch mode.

(2) Second Embodiment

Steps (B) through (E) of the second embodiment are the same as Steps (B) through (E) of the first embodiment:

The second embodiment is illustrated schematically in FIG. 3. (301) is a washing stage, and (302) is a rinsing stage. (303a, 303b) shows solvents, and (304a, 304b) shows waste solvents from each step of (301) and (302). (305) is separation step in order to obtain purified P-Sol. (306) is a cooling separation step in order to obtain CHC-rich phase and HFE-rich phase. (307) is an azeotropic distillation step in order to obtain pure HFE and an azeotrope of CHC and HFE. (312) is an azeotropic distillation step in order to obtain pure CHC and an azeotrope of CHC and HFE.

The washing step of the second method is the same as the washing step of the first embodiment except that in the second embodiment, a relatively pure CHC is used as the second solvent. In an embodiment, the second solvent comprises dichloromethane (DCM). Preferably, the second solvent is relatively pure DCM and the third solvent is relatively pure HFE. For DCM, the term "relatively pure" means the amount of DCM in the relatively pure DCM is about 95 wt. % or more, based on the weight of the relatively pure DCM.

As set out in the preceding section, the second embodiment differs (FIG. 3) from the first embodiment (FIG. 2) in that the second embodiment uses a second solvent comprising (or consisting of or consisting essentially of) CHC (e.g., relatively pure CHC), and the third solvent comprises (or consists of or consists essentially of) HFE (e.g., relatively pure HFE). Apart from the choice of the second and third solvents, the second embodiment also differs from the first embodiment in Step (F).

In Step (F) of the second embodiment, a portion of the CHC-rich phase from Step (E) can be conducted (309 in FIG. 3) to the washing stage and/or to a separation step (312 in FIG. 3) where a first product comprising relatively pure CHC can be separated as described in Step (F)(c) (i) above. As described in Step (F)(c)(ii) above, a portion of the first product can be conducted (313 in FIG. 3) to the washing stage to replenish at least a portion of the washing solvent that has been conducted away from the washing stage in the first stream. A second product can also be separated from the CHC-rich phase. The second product is generally at least a portion of the CHC-rich phase that remains after separation of the relatively pure CHC. For example, as shown in FIG. 3 the second product can comprise an azeotrope of CHC and HFE.

As shown in the figure, a portion of the second product can be conducted to Step (E) (311 in FIG. 3), which is described in Step (F) (c) (iii). Alternatively, at least a portion of the second product can be combined with the fourth product before these products are conducted to Step (E).

In the second embodiment, cooling of the third stream is conducted as described in the description of the first embodiment. For example, the third stream, can be cooled to a temperature no warmer than about −15° C., or in the range of from about −20° C. to about −50° C. In an embodiment, the HFE-rich phase has an HFE content (e.g., $C_4F_9OCH_3$) of about 82 wt. % based on the weight of the HFE-rich phase, and the CHC-rich phase has a CHC content (e.g., DCM) content of about 88 wt. %, based on the weight of the CHC-rich phase. This can be accomplished by cooling the third stream to a temperature of about −30° C.

Figure 7:
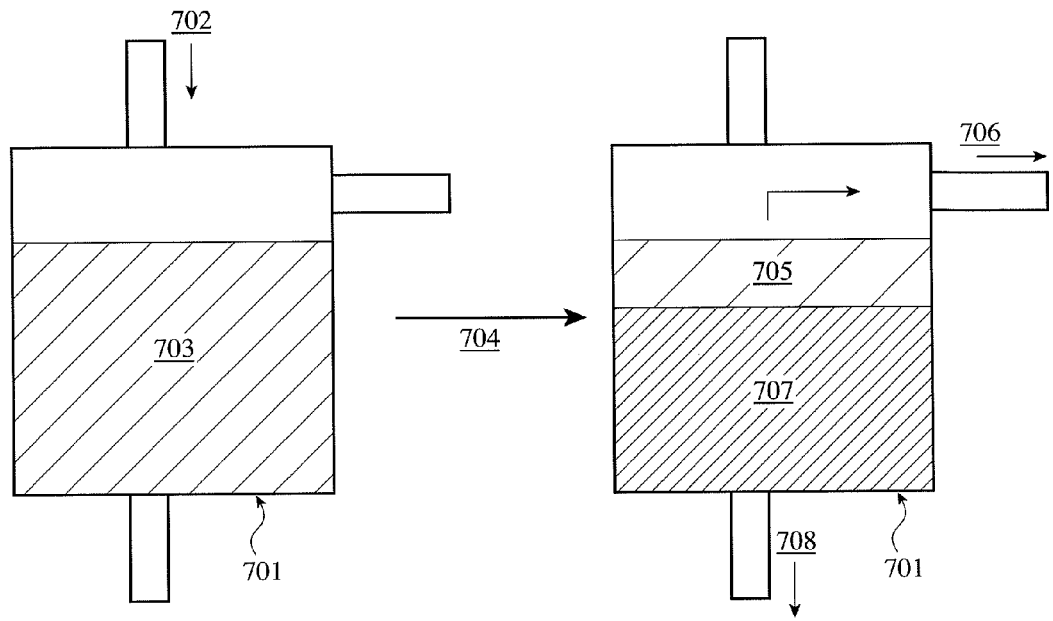
FIG. 7 schematically shows an embodiment where the CHC-rich phase is conducted away from the cooling step to a purification region where the CHC-rich phase is heated to separate a first product (purified CHC) and a second product (an azeotrope of CHC and HFE) from the CHC-rich phase.

The separation of the third and fourth product is described in the discussion of the first embodiment. The separation of the first and second products from the CHC-rich phase (as shown in FIG. 3) will now be described in more detail. The method selected for separating the first and second products from the CHC rich phase is not critical, as long as a first product comprising relatively pure CHC can be obtained. In an embodiment, distillation of the CHC rich phase can be used, shown schematically in FIG. 7, where the CHC rich phase (702) is conducted into a separation zone (701) (e.g., a vessel or tank). The CHC-rich phase in the separation zone is heated (704) in order to separate the first product (707) from the CHC rich phase (703). Accordingly, the CHC rich phase can be heated to a temperature in the range of from about boiling point of the CHC—HFE azeotrope to about the boiling temperature of CHC. For example, when the CHC-rich phase comprises DCM and $C_4F_9OCH_3$, the temperature can be in the range of from about 35.8° C. to about 40° C., at atmospheric pressure. When the CHC rich phase is distilled, a second product comprising, e.g., a vapor of an HFE-CHC azeotrope (705) can be conducted away as an overhead stream from an upper region of the separation zone (706). A first product comprising relatively pure CHC can be conducted away as a liquid stream from a lower region of the separation zone (708), as shown in FIG. 7. The first and second products, like the third and fourth products can recycled to the process for re-use, or stored, or further processed, or conducted away from the process. Like the first embodiment, the second embodiment can be operated continuously, semi-continuously, or in batch mode.

[3] Optional Steps

After the P-sol removal step, the extrudate can be further processed in optional steps for, e.g., a stretching a microporous membrane (re-stretching or dry stretching), a heat treatment step, a cross-linking step, e.g., with ionizing radiation, a hydrophilic treatment step, and/or a surface coating step. These optional steps are described in PCT application WO 2007/117042, which is incorporated herein by reference.

[4] Microporous Membrane and Battery Separator

The microporous membrane resulting from the processes described above can be used for example, as a battery separator. The method is illustrated schematically in FIG. 1. Hereinafter, symbols of 101 to 116 show the numbers in FIG. 1. Consequently, in one embodiment, the invention relates to a method for producing a microporous battery separator, comprising:
  (2) combining polymer resin(s) and at least one process solvent (P-sol) (102) to form at least one polymeric solution (103);
  (3) extruding the polymeric solution(s) through a die or dies to form a polymeric extrudate (104);
  (4) optionally cooling (105) and/or stretching (106) the extrudate;
  (5) removing at least a portion of the process solvent from the extrudate by the steps of;
    (A) contacting the extrudate with a second solvent comprising at least one chlorinated hydrocarbon in a washing stage (107); and then
    (B) contacting the washed extrudate from step (A) with a third solvent comprising at least one hydrofluoroether in a rinsing stage (108),
    (C) conducting a first stream away from the washing stage, the first stream comprising at least a portion of the chlorinated hydrocarbon in the washing stage and/or conducting a second stream away from the rinsing stage, the second stream comprising at least a portion of the hydrofluoroether in the rinsing stage (112); and
    (E) cooling (114) at least a portion of the first and/or at least a portion of the second stream, and separating therefrom a first phase rich in chlorinated hydrocarbon, a second phase rich in hydrofluoroether, or both the first phase and the second phase.

The process can optionally comprise a Step (1) (101) where combining one or more polymer resins are combined, e.g., by conventional methods such as melt-blending, dry mixing, etc. An optional Step (D) (113) can also be used for combining at least a portion of each of the first and second streams to form a third stream and then separating at least a portion of the P-sol from the combined streams, or separating at least a portion of the P-sol from the first stream and then combining the first stream (now lean in P-sol) with the second stream to form the third stream. The third stream, which comprises portions of the first and second stream can then be cooled in Step (E) to separate a first phase rich in chlorinated hydrocarbon, a second phase rich in hydrofluoroether, or both.

The process can further comprise recycling at least a portion of the first phase to the washing stage (116) and/or recycling at least a portion of the second phase to the rinsing stage (115). This step, Step (F) can be conducted as described above for the preceding embodiments.

FIG. 1 shows one embodiment of a method for producing a microporous membrane. Steps (1), (2), and (3) are conducted by preparing a solution by extruding a polymer and P-sol in FIG. 1. Optional cooling (105) and stretching (106) steps are also shown. The extrudate or stretched extrudate is conducted to the washing step (107), and the washed extrudate is conducted to a rinsing step (108). An optional drying step (109) can also be used, as shown. The microporous membrane can be conducted to further optional steps heat treatment step (110), and then the heat-treated microporous membrane can be optionally wound up for storage or further processing (111).

[5] Properties of the Microporous Polyolefin Membrane

In an embodiment, the microporous polyolefin membrane has at least one of the following properties. For example, the microporous polyolefin membrane can have all of the following properties.
  (a) Porosity of about 25% to about 80%
  When the porosity of the microporous polyolefin membrane is less than about 25%, it can be more difficult to produce a membrane having sufficient air permeability. When the porosity exceeds about 80%, it can be more difficult to produce a sufficiently durable battery having a sufficiently low electrical impedance.
  (b) Air Permeability of about 20 to about 500 Seconds/100 $Cm^3$ (Converted to the Value at 20-μm Thickness)
  When the air permeability of the microporous polyolefin membrane (as measured by an Oken-type air permeability meter) ranges from about 20 seconds/100 $cm^3$ to about 500 seconds/100 $cm^3$, it is less difficult to produce a battery having acceptably large capacity and good cyclability. When the air permeability is less than about 20 seconds/100 $cm^3$, it is more difficult to produce a battery having acceptable shut down characteristics, e.g., a battery that will not support Lithium ion conduction at an excessive operating temperature, e.g., above 140° C.
  (c) Heat Shrinkage Ratio of 10% or Less
  When the heat shrinkage ratio of the microporous polyolefin membrane (after the membrane has been heated to 105° C. for 8 hours) exceeds 10% in both machine and transverse directions, it can be more difficult produce a battery that is sufficiently resistant to internal short-circuiting, especially near the edges of the separators. In an embodiment, the heat shrinkage ratio is less than about 8% in both the machine and the transverse directions.

(d) Thickness

In an embodiment, the thickness of the microporous membrane can be selected by purpose. It can range from about 3 μm to about 200 μm, or from about 5 μm to about 100 μm as battery separator for example.

[6] Battery

The microporous polyolefin membranes of the present invention are suitable as separators for secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, particularly for lithium ion secondary batteries. Explanations will be made below on the lithium ion secondary batteries.

The lithium ion secondary battery comprises a cathode and an anode laminated via a separator, and the separator contains an electrolytic solution (electrolyte). The electrode may have a known structure, not particularly restricted. The electrode structure may be, for instance, a coin type in which disc-shaped cathode and anode are opposing, a laminate type in which planar cathodes and anodes are alternately laminated, a toroidal type in which ribbon-shaped cathode and anode are wound, etc.

The cathode usually comprises a current collector, and a cathodic active material layer capable of absorbing and discharging lithium ions, which is formed on the current collector. The cathodic active materials may be inorganic compounds such as transition metal oxides, composite oxides of lithium and transition metals (lithium composite oxides), transition metal sulfides, etc. The transition metals may be V, Mn, Fe, Co, Ni, etc. Preferred examples of the lithium composite oxides are lithium nickelate, lithium cobaltate, lithium manganate, laminar lithium composite oxides based on α-NaFeO$_2$, etc. The anode comprises a current collector, and a negative-electrode active material layer formed on the current collector. The negative-electrode active materials may be carbonaceous materials such as natural graphite, artificial graphite, cokes, carbon black, etc.

The electrolytic solution is obtained by dissolving a lithium salt in an organic solvent. The lithium salts may be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts may be used alone or in combination. The organic solvents may be organic solvents having high boiling points and high dielectric constants such as ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, etc. These organic solvents may be used alone or in combination. Because the organic solvents having high dielectric constants have high viscosity, while those having low viscosity have low dielectric constants, their mixtures are preferably used.

When the battery is assembled, the separator is impregnated with the electrolytic solution, so that the separator (microporous polyolefin membrane) is provided with ion permeability. The impregnation treatment is usually conducted by immersing the microporous polyolefin membrane in the electrolytic solution at room temperature. When a cylindrical battery is assembled, for instance, a cathode sheet, a microporous polyolefin membrane separator and an anode sheet are laminated in this order, and the resultant laminate is wound to a toroidal-type electrode assembly. The resultant electrode assembly is charged into a battery can and then impregnated with the above electrolytic solution, and a battery lid acting as a cathode terminal provided with a safety valve is caulked to the battery can via a gasket to produce a battery.

[7] EXAMPLES

The present invention will be explained in more detail referring to Examples below without intention of restricting the scope of the present invention.

Example 1

Polyolefin resins were dry-blended as follows: (i) 99.625 parts by mass of a polyolefin (PO) composition comprising 20% by mass of ultra-high-molecular-weight polyethylene (UHMWPE) having a weight-average molecular weight (Mw) of 2.0×10$^6$, (ii) 80% by mass of high-density polyethylene (HDPE) having Mw of 3.5×10$^5$; and (iii) 0.375 parts by mass of tetrakis[methylene-3-(3,5-ditertiary-butyl-4-hydroxyphenyl)-propionate] methane as an antioxidant. The polyethylene composition comprising the UHMWPE and the HDPE had a melting point Tme of 135° C. and a crystal dispersion temperature of 90° C.

The Mws of UHMWPE and HDPE were measured by a gel permeation chromatography (GPC) method under the following conditions.

Measurement apparatus: GPC-150C available from Waters Corporation,

Column: Shodex UT806M available from Showa Denko K.K.,

Column temperature: 135° C.,

Solvent (mobile phase): o-dichlorobenzene,

Solvent flow rate: 1.0 ml/minute,

Sample concentration: 0.1% by mass (dissolved at 135° C. for 1 hour),

Injected amount: 500 μl,

Detector: Differential Refractometer available from Waters Corp., and

Calibration curve: Produced from a calibration curve of a single-dispersion, standard polystyrene sample using a predetermined conversion constant.

30 parts by mass of the resultant mixture was charged into a strong-blending double-screw extruder having an inner diameter of 58 mm and L/D of 52.5, and 70 parts by mass of liquid paraffin (LP: 50 cSt at 40° C.) was supplied to the double-screw extruder via a side feeder. Melt-blending was conducted at 230° C. and 250 rpm to prepare a polyolefin solution. This polyolefin solution was extruded from a T-die mounted to a tip end of the double-screw extruder, and drawn and cooled by cooling rolls controlled at 10° C. while reeling up, to form a gel-like sheet.

Using a tenter-stretching machine, the gel-like sheet was simultaneously biaxially stretched at 115° C., such that the stretching magnification was 5 folds in both machine (to the direction in which the film was drawn) and transverse directions. The stretched membrane was fixed to an aluminum frame of 20 cm×20 cm, and immersed in a washing solvent (comprising the DCM rich phase by obtained cooling separation) comprising 435 g of DCM [dichloro methane/surface tension: 27.3 mN/m (25° C.), boiling point: 40.0° C.] and 75 g of hydrofuluoroether (C$_4$F$_9$OCH$_3$) [surface tension: 13.6 mN/m (25° C.), boiling point: 61° C.] controlled at 25° C., and washed with the vibration of 100 rpm for 60 seconds (step (A)). Then the washed membrane was immersed in a rinsing solvent (comprising $C_4F_9OCH_3$ rich phase obtained by cooling separation) comprising 85 g of DCM and 415 g of $C_4F_9OCH_3$ controlled at 25° C., and rinsed with the vibration of 100 rpm for 60 seconds (step (B)). The resultant membrane was air-cooled at room temperature, and heat-set at 120° C. for 10 minutes while fixed to the aluminum frame, to produce a microporous polyolefin membrane.

After conducting the washed membrane to step (B), first and second effluents (first and second streams) were collected from steps (A) and (B). The first stream was distilled at a temperature of 70° C. under atmospheric pressure to remove LP. The distilled first stream and the second stream were combined to form a third stream comprised DCM and $C_4F_9OCH_3$ (step (D)). LP was reused as a process solvent.

A cooling separation of the third stream from step (D) was conducted in Step (E) at a temperature of −30° C. to produce a DCM-rich phase and a $C_4F_9OCH_3$-rich phase. The DCM-rich phase contained 85 wt. % of DCM and 15 wt. % of $C_4F_9OCH_3$, based on the total weight of the DCM-rich phase. The $C_4F_9OCH_3$-rich phase contained 17 wt. % of DCM and 83 wt. % of $C_4F_9OCH_3$, based on the total weight of the $C_4F_9OCH_3$-rich phase. The DCM-rich phase and the $C_4F_9OCH_3$-rich phase were reused as a washing solvent and a rinsing solvent respectively.

Example 2

A microporous polyethylene membrane was produced in the same manner as in Example 1, except that the cooling separation of the third stream was conducted at a temperature of −14° C., and that a DCM-type mixture comprising 275 g of DCM and 225 g of $C_4F_9OCH_3$ as a second solvent was used as a washing stage and a second DCM-$C_4F_9OCH_3$ mixture comprising 225 g of DCM and 275 g of $C_4F_9OCH_3$ as a third solvent was used in the rinsing stage.

Example 3

A microporous polyethylene membrane was produced in the same manner as in Example 1, except that the DCM-rich phase and the $C_4F_9OCH_3$-rich phase were distilled at a temperature of 40° C. under atmospheric pressure to obtain a purified DCM and a purified $C_4F_9OCH_3$ respectively, and that 500 g of the purified DCM was used as the second solvent in the washing stage and 500 g of the purified $C_4F_9OCH_3$ was used as the third solvent in the rinsing stage.

Comparative Example 1

A microporous polyethylene membrane was produced in the same manner as in Example 1, except that only a 500 g of DCM as a first solvent is used in the washing stage and in the rinsing stage.

Material Balance Example

Figure 8:
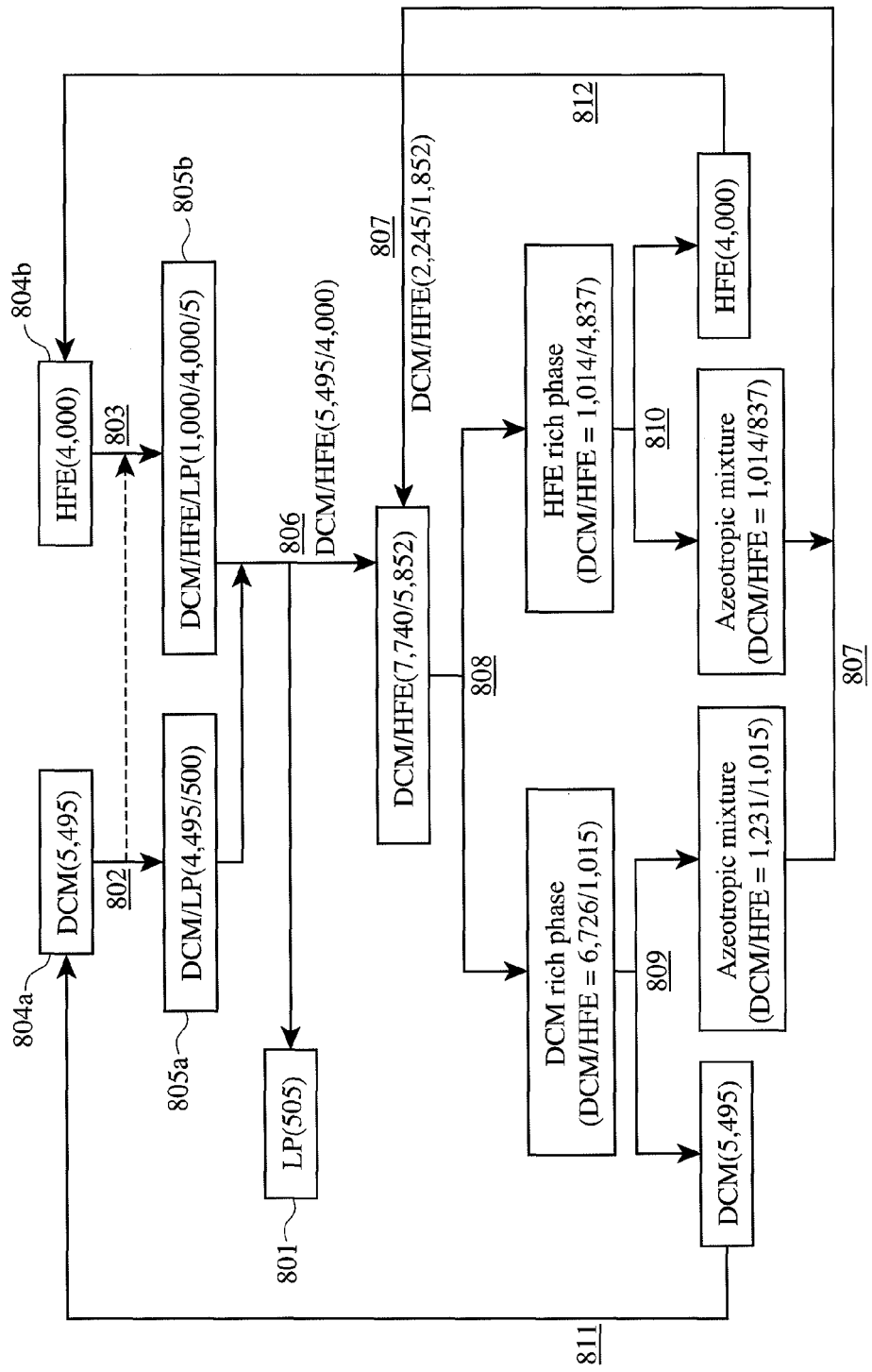
FIG. 8 schematically shows a material balance for solvent recovery when the temperature of the cooling step is −30° C.

FIG. 8 shows an embodiment simulation for balance in the process of solvent recovery in the second method in this invention. Hereinafter, symbols of (801) to (812) show the numbers in FIG. 8. Liquid paraffin (LP) (801) is used as a first solvent. (804a, 804b) shows solvents, and (805a, 805b) shows waste solvents from each step of (802) and (803). A polymer extrudate is washed with 5,495 weight parts of DCM as a second solvent in a washing stage (802) to make a first stream comprising 4,495 weight parts of DCM and 500 weight parts of liquid paraffin. The washed extrudate was rinsed with 4,000 weight parts of HFE as a third solvent in a rinsing stage (803) to make a second stream comprising 1,000 weight parts of DCM, 4,000 weight parts of HFE, and 5 weight parts of liquid paraffin. The first and second stream is combined to separate liquid paraffin and to make third stream comprising 5,495 weight parts of DCM and 4,000 weight parts of HFE (806). The third stream is combined with two azeotropic mixtures obtained in a downstream separation stage (807). The combined composition comprising 7,740 weight parts of DCM and 5,852 weight parts of HFE is separated DCM rich phase containing 6,726 weight parts of DCM and 1,015 weight parts of HFE from HFE rich phase containing 1,104 weight parts of DCM and 4,837 weight parts of HFE by cooling separation (808). Then the demand HFE rich phases are distilled to separate pure DCM, pure HFE and azeotropic mixture respectively. The DCM rich phase is distilled azeotropically to separate 5,495 weight parts of pure DCM and an azeotropic mixture comprising 1,231 weight parts of DCM and 1,015 weight parts of HFE (809). The HFE rich phase is distilled azeotropically to separate 4,000 weight parts of pure HFE and an azeotropic mixture comprising 1,014 weight parts of DCM and 837 weight parts of HFE (810). 5,495 weight parts of the pure DCM was conducted (811) to the washing stage as a second solvent and 4,000 of the pure HFE is conducted (812) to the rinsing stage as a third solvent to recycle effectively in the process. The two azeotropic mixtures are conducted (807) to the cooling stage to combine the third waste stream. Consequently, the azeotropic mixtures are recycled effectively in the process.

The properties of the microporous membranes obtained in Examples and Comparative were measured by the following methods. The results are shown in Table 1.

(1) Average Thickness (μm)

The thickness of each microporous membrane was measured by a contact thickness meter at 1-cm longitudinal intervals over the width of 20 cm, and averaged.

(2) Air Permeability (Sec/100 $Cm^{3/20}$ μm)

Air permeability $P_1$ measured on each microporous membrane having a thickness $T_1$ with Oken's Gurley measurement equipment was converted to air permeability $P_2$ at a thickness of 30 μm by the equation of $P_2=(P_1 \times 30)/T_1$.

(3) Porosity (%)

Measured by a weight method.

(4) Heat Shrinkage Ratio (%)

The shrinkage ratios of each microporous membrane in both longitudinal and transverse directions is measured three times when exposed to 105° C. for 8 hours, and averaged to determine the heat shrinkage ratio.

TABLE 1

Properties of Microporous Membrane

| | | Example 1 | Example 2 | Example 3 | Com. Example 1 |
|---|---|---|---|---|---|
| Average Thickness (μm) | | 29.5 | 30.2 | 30.4 | 29.8 |
| Air Permeability (sec/100 cm³/30 μm) | | 610 | 634 | 585 | 710 |
| Porosity (%) | | 39.0 | 38.2 | 39.5 | 39.2 |
| Heat Shrinkage Ratio (%) | MD | 3.8 | 3.8 | 3.9 | 5.0 |
| | TD | 3.2 | 3.1 | 3.2 | 4.0 |

As shown in Table 1, the microporous polyolefin membranes of Examples 1 to 3 have well-balanced properties of air permeability, porosity and heat shrinkage ratio. On the other hand, the microporous polyolefin membrane of Comparative Example 1 with washing and rinsing in DCM was poorer in air permeability and heat shrinkage than those of Examples 1 to 3. Although the membrane having well-balanced properties of air permeability, porosity and heat shrinkage ratio was obtained in Example 3, it is uneconomical and not practical because it is used pure DCM in washing stage and pure HFE in rinsing stage which provided by pure make-up solvents to replace solvent conducted away in the first and second streams. On the other hand, although the membrane were washed with DCM rich solvent or azeotropic composition, and rinsed with HFE rich solvent in Example 1 and 2, the membrane having well-balanced properties of air permeability, porosity and heat shrinkage ratio is obtained which are almost equal to those of the membrane of Example 3. It is believed that washing and rinsing with DCM, as in Comparative Example 1, results in pores on the surface of membrane are relatively easy to crush. Consequently, the membrane of Comparative Example 1 has poorer in air permeability than that of Examples 1 to 3 in spite of having almost the same porosity. Furthermore, the membrane of Comparative Example 1 has relatively poor heat shrinkage ratio because of remaining internal strain.

The invention claimed is:

1. A process for removing a first solvent from a porous polymeric extrudate comprising:
   (A) contacting the extrudate with a second solvent in a first stage;
   (B) contacting the extrudate from step (A) with a third solvent in a second stage;
   (C) conducting a first stream away from the first stage, the first stream comprising at least a portion of the second solvent in the first stage and/or conducting a second stream away from the second stage, the second stream comprising at least a portion of the third solvent in the second stage, and separating the first solvent from the first stream, the second stream, or both; and
   (E) cooling at least a portion of the first and/or second stream and separating therefrom at least one of a first phase rich in the second solvent or a second phase rich in the third solvent.

2. The process according to claim 1 wherein at least a portion of each of the first and second streams from step (C) are combined in a step (D) prior to step (E) and wherein at least a portion of the first solvent is separated from the first stream and/or the combined streams prior to step (E).

3. The process according to claim 1 wherein the first solvent comprises liquid paraffin.

4. The process according to claim 1, wherein the second solvent comprises at least one chlorinated hydrocarbon (CHC), and wherein the third solvent comprises at least one hydrofluoroether (HFE).

5. The process according to claim 4 the hydrofluoroether is at least one of $C_4F_9OCH_3$, $C_4F_9OC_2H_5$ and $C_6F_{13}OCH_3$.

6. The process according to claim 4 wherein the chlorinated hydrocarbon is at least one of dichloromethane, trichloromethane, tetrachloromethane, 1,1-dichloroethane, 1,2-dichloroethane and trichloroethane.

7. The process according to claim 4, wherein the first phase is a CHC-rich phase and wherein the second phase is an HFE-rich phase, and further comprising a step (F) of at least one of
   (a) conducting at least a portion of the CHC-rich phase from step (E) to step (A);
   (b) conducting at least a portion of the HFE-rich phase from step (E) to step (B);
   (c) (i) separating a first and second product, from the CHC-rich phase of step (E) wherein the first product comprises relatively pure chlorinated hydrocarbon and the second product comprises at least a portion of the remainder of the CHC-rich phase of step (E) following separation of the first product, and carrying out the steps of (c) (ii) and/or (c)(iii)
      (ii) conducting at least a portion of the first product to step (A),
      (iii) conducting at least a portion of the second product to at least step (A) and/or step (E);
or
   (d) (i) separating a third and fourth product from the HFE-rich phase of step (E) wherein the third product comprises relatively pure hydrofluoroether and the fourth product comprises at least a portion of the remainder of the HFE-rich phase of step (E) following separation of the third product, and then carrying out the steps of (d)(ii) and/or (d)(iii)
      (ii) conducting at least a portion of the third product to step (B),
      (iii) conducting at least a portion of the fourth product to steps (A) and/or (E).

8. The process according to claim 1, wherein the process is operated continuously.

9. The process according to claim 7 wherein the CHC-rich phase is an azeotrope of chlorinated hydrocarbon and hydrofluoroether.

10. The process according to claim 7 wherein the second and fourth products are an azeotrope of chlorinated hydrocarbon and hydrofluoroether and wherein the second and fourth products are recycled to extinction in step (E).

11. A process for producing a microporous polymeric film, the process comprising
   (2) combining polymer resin(s) and one or more process solvents to form a polymeric solution;
   (3) extruding the polymeric solution to produce a polymeric extrudate;
   (5) removing at least a portion of the process solvent from the extrudate by the steps of
      (A) contacting the extrudate with a second solvent comprising at least one chlorinated hydrocarbon (CHC) in a washing stage; and then
      (B) contacting the washed extrudate from step (A) with a third solvent comprising at least one hydrofluoroether (HFE) in a rinsing stage,
      (C) conducting a first stream away from the washing stage, the first stream comprising at least a portion of the chlorinated hydrocarbon in the washing stage and/or conducting a second stream away from the rinsing stage, the second stream comprising at least a portion of the hydrofluoroether in the rinsing stage; and
      (E) cooling at least a portion of the first and/or at least a portion second stream, and separating therefrom a first phase rich in chlorinated hydrocarbon, a second phase rich in hydrofluoroether, or both the first phase and the second phase.

12. The process according to claim 11 wherein at least a portion of each of the first and second streams from step 5(C) are combined in a step 5(D) prior to step 5(E) and wherein at least a portion of the first solvent is separated from the first stream and/or the combined streams prior to step 5(E); and wherein the process further comprises a step (1) of combining polymer resins.

13. The process according to claim 11 wherein the first solvent comprises liquid paraffin.

14. The process according to claim 11, the hydrofluoroether is at least one of $C_4F_9OCH_3$, $C_4F_9OC_2H_5$ and $C_6F_{13}OCH_3$.

15. The process according to claim 11, wherein the chlorinated hydrocarbon is at least one of dichloromethane, trichloromethane, tetrachloromethane, 1,1-dichloroethane, 1,2-dichloroethane and trichloroethane.

16. The process according to claim 13, wherein the first phase is a CHC-rich phase and wherein the second phase is an HFE-rich phase, and further comprising step (F) of
(a) conducting at least a portion of the CHC-rich phase from step (E) to step (A);
(b) conducting at least a portion of the HFE-rich phase from step (E) to step (B);
(c) (i) separating a first and second product, from the CHC-rich phase of step (E) wherein the first product comprises relatively pure chlorinated hydrocarbon and the second product comprises at least a portion of the remainder of the CHC-rich phase of step (E) following separation of the first product, and then carrying out the steps of (c) (ii) and/or (c)(iii)
(ii) conducting at least a portion of the first product to step (A),
(iii) conducting at least a portion of the second product to at least step (A) and/or step (E);
or
(d) (i) separating a third and fourth product from the HFE-rich phase of step (E) wherein the third product comprises relatively pure hydrofluoroether and the fourth product comprises at least a portion of the remainder of the HFE-rich phase of step (E) following separation of the third product, and then carrying out the steps of (d)(ii) and/or (d)(iii)
(ii) conducting at least a portion of the third product to step (B),
(iii) conducting at least a portion of the fourth product to steps (A) and/or (E).

17. The process according to claim 11, wherein the process is operated continuously.

18. The process according to claim 16 wherein the CHC-rich phase is an azeotrope of chlorinated hydrocarbon and hydrofluoroether.

19. The process according to claim 16 wherein the second and fourth products are an azeotrope of chlorinated hydrocarbon and hydrofluoroether and wherein the second and fourth products are recycled to extinction in step (E).

20. The process according to claim 11, further comprising step (4) of cooling and/or stretching the extrudate of step (3).

21. A microporous membrane made by the process of claim 11.

22. A battery comprising an anode, a cathode, an electrolyte, and a battery separator located between the anode and the cathode, wherein the battery separator comprises the microporous membrane of claim 21.

23. A source or sink of electric charge comprising the battery of claim 22.

* * * * *